United States Patent [19]

Kopp et al.

[11] Patent Number: 4,935,143
[45] Date of Patent: Jun. 19, 1990

[54] CLEANING OF FILTERS

[75] Inventors: Clinton V. Kopp, Castle Hill; Robert J. W. Streeton, Windsor; Marcus J. Fabig, Epping; Kerrie Wyatt, Turramurra, all of Australia

[73] Assignee: Memtec Limited, Parramatta, Australia

[21] Appl. No.: 191,164

[22] PCT Filed: Jul. 13, 1987

[86] PCT No.: PCT/AU87/00214
§ 371 Date: Mar. 10, 1988
§ 102(e) Date: Mar. 10, 1988

[87] PCT Pub. No.: WO88/00494
PCT Pub. Date: Jan. 28, 1988

[30] Foreign Application Priority Data

Jul. 11, 1986 [AU] Australia .............................. PH6856
Aug. 6, 1986 [AU] Australia .............................. PH7301
Apr. 21, 1987 [AU] Australia .............................. PI1514
Apr. 21, 1987 [AU] Australia .............................. PI1513
Sep. 5, 1987 [AU] Australia .............................. PH7867

[51] Int. Cl.$^5$ ............................................ B01D 13/00
[52] U.S. Cl. ................................ 210/636; 210/321.69; 210/500.23
[58] Field of Search .............. 210/500.23, 636, 321.69, 210/410, 412

[56] References Cited

U.S. PATENT DOCUMENTS

| 4,552,669 | 11/1985 | Sekellick | 210/410 X |
| 4,579,662 | 4/1986 | Jonsson | 210/636 |
| 4,767,539 | 8/1988 | Ford | 210/636 |
| 4,816,160 | 3/1989 | Ford et al. | 210/321.69 X |

FOREIGN PATENT DOCUMENTS

| 34400/84 | 4/1985 | Australia | 210/636 |
| 1392084 | 4/1975 | United Kingdom | 210/636 |
| 1535832 | 12/1978 | United Kingdom | 210/636 |

OTHER PUBLICATIONS

Derwent Abstract Accession No. 85-287044/46, Class J01, JP,A, 60197206, (Daicel Chem Ind KK) Mar. 16, 1984, (16.03.84).
Advances in Hollow Fiber Ultrafiltration Technology, Barry R. Breslau et al., Woburn, Mass.
Anti-Fouling Techniques in Cross-Flow Microfiltration, B. Milisic et al., Institut Francais des Techniques Separatives, France and Lyonnaise des Eaux France. This paper was presented to the IVth World Filtration Congress*, Ostend, Belgium, Apr. 1986.

Primary Examiner—Frank Spear
Attorney, Agent, or Firm—Oblon, Spivak, McClelland, Maier & Neustadt

[57] ABSTRACT

A filter (10) has a shell (11) within which there is a bundle of microporous fibres (12). Pressurized feed suspension is introduced through inlet (15) and passes over the external walls of the fibers (12) with the clarified liquid being drawn from the lumens of the fibres (12) through outlet port (16) and the concentrated ffee being discharged through outlet (17). The solids retained within the shell are removed by a gaseous backwash cycle in which pressurized gas is introduced through the lumens and passes through the wall of the fibres (12) to dislodge solids retained on or in the fibre walls. The gaseous cleaning step is enhanced by varying the pressure within the housing (11) of the filter (10) while the gas is being introduced into the filter.

70 Claims, 11 Drawing Sheets

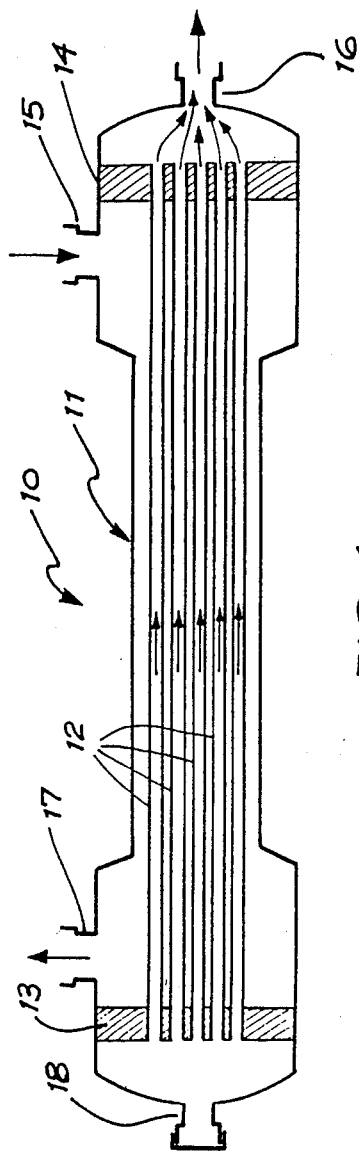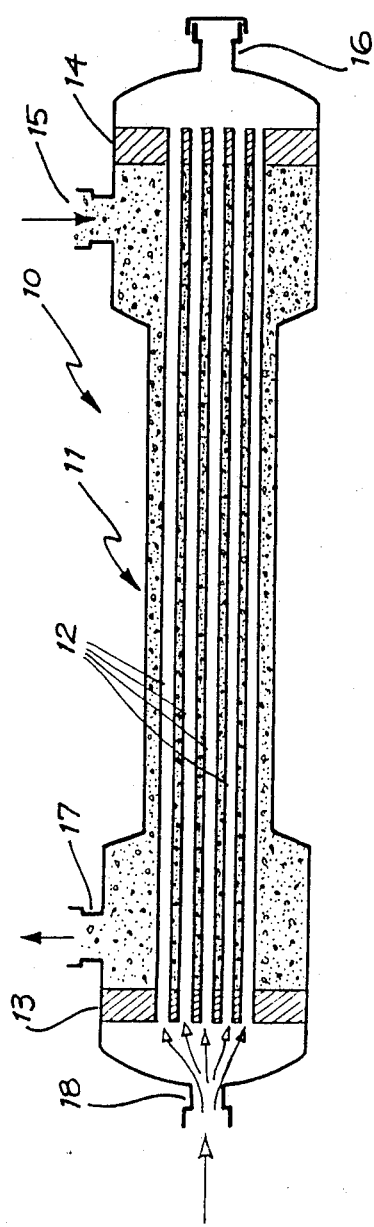

CLEANING OF FILTERS

FIELD OF INVENTION

This invention relates to the cleaning and removal of solids from microporous hollow fibre filters.

BACKGROUND ART

International Patent Application Nos. PCT/AU84/00192 and PCT/AU86/00049 describe methods for backwashing elastic microporous hollow fibre filters The filters disclosed in these applications consist of a bundle of polymeric (such as polypropylene) fibres contained within a housing having a feedstock inlet thereto and a concentrate outlet therefrom. The feedstock is applied to the outside of the fibres and some of the liquid contained in the feedstock passes through the walls of the fibres and is drawn off from the fibre lumens as filtrate.

The fibres are cast in resin at both ends of the shell or housing with the ends of the lumens open to constitute a tube-in-shell configuration. Although not described in our above mentioned specifications, the fibres may be cast into one end of the housing with the other ends of fibres free but with the free ends of the lumens sealed to constitute a candle-in-shell configuration.

During the filtering operation, which may be either to recover clarified liquid or to recover concentrated solids, solids contained in the feedstock either pass out of the shell with the remainder of the feedstock carrier stream, or are retained on or in the fibres. These retained solids cause fouling and blockage of the filter. Industrial practice with the more common tube-in-shell microfilters for many years was commonly to apply the feedstock to the inner surface of the fibres by forcing flow through the fibre lumens at such a rate that turbulence scoured the walls of the fibres, retarding blockage by solid material.

In the above mentioned specifications, the feedstock is applied to the outer surface of the fibres, with a penalty of low feedstock flow velocity and consequent low turbulence resulting in a rapid rate of blockage of the pores of the fibres. This is overcome by the application of a two-stage backwashing cycle.

In the first stage a liquid backwash is applied to the lumens of the fibres such that the liquid passes through the porous walls of the fibres and sweeps retained solids out of substantially all of the pores in the walls of the fibres. In the second stage, a gaseous backwash is applied to the lumens of the fibres such that the gas passes through the larger pores in the walls of the fibres, stretching them and dislodging retained blocking solids.

International Patent Application No. PCT/AU86/00049 discloses a method of applying pressure such that the gaseous backwash is applied evenly over the inner surface of the hollow fibres. In this method, the volume of liquid backwash is that volume of liquid trapped in the pores of the walls of the fibres. When the backwash stage is begun, low pressure gas is applied to clear the fibre lumens of liquid, and then high pressure gas is applied so as to exceed the bubble point of the fibres and force gas through the larger pores in the fibre walls.

The application of the two-stage backwashing regime discussed above restores filtrate flux to a high value that is, however, not as high as the initial value At each stage this slight diminution of flux reduces the filtration capacity of the fibres. Eventually chemical cleaning is required. This is expensive and time consuming Another method of cleaning the fibres is known as reverse flow and is reviewed in "Ultrafiltration Membranes and Application", Edited by A.R. Cooper, a record of a Symposium of the American Chemical Society, Sept. 11-13, 1979, Pages 109 to 127, "Advances in Hollow Fibre Ultrafiltration Technology", by B.R. Breslau.

In the Breslau method the feed is applied to the lumens of the fibres at high velocity so that there is a large pressure drop down the length of the fibres By closing off the filtrate flow at the distal end of the shell, the filtrate pressure climbs within the shell and forces filtrate backwards through the fibre walls in the distal end of the fibre bundle. The direction of flow of feedstock is then reversed and the process repeated so as to force filtrate backwards through the fibre walls in the proximal end of the fibre bundle Filtrate is produced in one end of the shell and used to backwash the fibres at the other end of the shell.

A distinction is made between the term "reversed flow (filtering)" as used by Breslau and the description of reversing the direction of flow while no filtering is occurring as hereinafter described.

The prior art also contains a number of references to filter systems which utilize pressure variations arising, For example, German specification No. 2,833,994 discloses a filtration process in which two fluid streams flow countercurrent to each other on either side of a filter medium. The flow of filtrate is subjected to a series of reductions of the flow cross section. These reductions with the associated acceleration in velocity induce a region of low pressure below the membrane, causing a flow of fluid through the membrane Netherlands specification No. 7,604,657 discloses a method for cleaning tubular membranes in which gas is dissolved in a liquid under pressure. The liquid is fed past the membrane and the pressure is reduced so that gas is released as small bubbles which lift solids from the membrane and carry them away.

Similarly, the feeding of gas - liquid mixture to the surface of the membrane is taught by Japanese specifications 61-129094 and 56-024006.

The cleaning of dead-end fibres dangling in a pot by ga cleaning causing writhing of the fibres is disclosed in British patent No. 2,120,952. Japanese specification 60-137404 teaches the installation of special equipment to vibrate dead-end fibres hanging in a pot during backwash and Russian specification No. 715,105 discloses air pulsing of wash water applied to a granulated filter.

Japanese specification No. 53-042186 teaches the periodic reversal of direction of flow of feed liquid in a membrane plate separator. Japanese specification No. 61-101209 discloses a method of applying a vacuum to eliminate air from the pores of a hydrophobic membrane.

Japanese specification No. 47-021748 discloses the reversal of application of air pressure. First air pressure drives liquid through the membrane. When backwashing with filtrate is required, the air pressure is applied to the filtrate. When a flow meter indicates sufficient washing, the air pressure is again applied to the feed side to restart the filtration.

The article "Anti-fouling Techniques in Cross-flow Microfiltration" by Milisic & Bersillon, Filtration &

Separation, November/December 1986, pp 347-349, teaches pulsing the feedstream as it is applied during normal filtration.

Banks of fibres in shell filter cartridges are frequently arranged in parallel. When one shell develops a blockage, flow bypasses this fibre bundle, the velocity slows, and the blockage becomes self-increasing through the system.

The need to optimize the frequency of cleaning cycles to maximize filtrate flow is discussed in International Patent Application No. PCT/AU84/00192.

For the procedure described to be successful, the fibres must be elastic. For practical considerations of each of manufacture and resistance to acid cleaning that must be applied eventually, and for strength, the fibres are generally chosen to be a thermoplastic such a polypropylene. Such thermoplastics are fundamentally hydrophobic and must be wetted before they can be used to filter aqueous feedstock streams.

The application of backwashing gas as described above has the undesired effect of partially drying the fibres. Small bubbles of gas are retained in the pores in the walls of the fibres where they effectively block filtration. The filtrate flux is initially high at the start of filtration, but rapidly drops as the fibres foul with solids. The application of the two stage backwashing regime restores the filtrate flux to a high value that is however, not as high as the initial value. At each stage this slight diminution of flux reduces the filtration capacity of the fibres. Eventually chemical cleaning and/or rewetting is required which is expensive and time consuming.

International Patent Application No. PCT/US83/02004 discloses the pressurized initial wetting of fibres in relation to cartridge units that are intended for a special use such as with blood, and which can be prewetted before shipment. However, in industrial situations, cartridges may be used for many applications that are not specified at the time of manufacture of the cartridge. For applications such as food use, the presence of extraneous wetting agents such as surfactants must be avoided and there is a need to wet the fibres with the liquid to be filtered. In these cases it is impractical to wet the fibres during manufacture. They must be wetted in place, immediately prior to use. The procedure described in our International Patent Application No. PCT/AU86/00049 utilizes a flow of feedstock to wash away the dislodged solids. However, it is sometimes necessary that the solid material be recovered in a dryer state than is the case with the processes described in our above International Patent Applications. This is particularly useful where solids recovery and dewatering are important.

According to the invention there is provided a method of operating a filter having elastic, porous, hollow fibres within a shell or housing comprising the steps of:

(i) introducing a liquid suspension feedstock into the shell or housing and directing said feedstock to the outer surface of the fibres whereby:
  (a) some of said feedstock passes through the walls of the fibres to be drawn from the fibre lumens as a filtrate or permeate,
  (b) some of the solids in said feedstock are retained on or in the pores of the fibres, with the non-retained solids being discharged from the shell or housing with the remainder of said feedstock,
(ii) periodically cleaning away the retained solids by:
  (a) introducing a pressurized gas into the fibre lumens which passes through the walls of the fibres to dislodge the retained solids, and,
  (b) varying the pressure within the shell whilst the gas is being introduced into the lumens.

According to another aspect of the invention, there is provided a method of operating a filter having a plurality of elastic, microporous hollow fibres with a shell or housing comprising the steps of:

(i) introducing a liquid suspension feedstock into the shell or housing and applying said feedstock to the outer surface of the fibres whereby:
  (a) some of said feedstock passes through the walls of the fibres to be drawn from the fibre lumens as a permeate,
  (b) some of the solids in said feedstock are retained on or in the pores of the fibres with the non-retained solids being removed from the shell with the remainder of said feedstock,
  (a) introducing a pressurized liquid through the fibre lumens which passes through the walls of the fibres to wash out at least some of the retained solids and then,
  (b) introducing through the fibre lumens a pressurized gas which passes through the walls of the fibres and stretches elastically at least some of the pores to dislodge any solids retained in those pores and which washes the external walls of the fibres, the gas being applied at a pressure which is sufficient to overcome the resistance to gas flow of the surface tension of the continuous phase of the filtrate within the pores of the membranes, and,
  (c) varying the pressure within the shell whilst the pressurized gas is being introduced into the lumens.

The pressure within the shell may be varied during cleaning in a number of ways such as by increasing the pressure within the shell above the normal gaseous cleaning pressure and then returning the pressure to the normal gaseous cleaning pressure or by decreasing the pressure within the shell below the normal gaseous cleaning pressure and then returning the pressure to the normal gaseous cleaning pressure.

The pressure within the shell may be increased by terminating the outflow of feed and then returned to normal gaseous cleaning pressure by recommencing flow of feed in either the same or the reverse direction.

The pressure within the shell may be decreased by terminating the inflow of feed and the return to normal gaseous cleaning pressure can be achieved by resuming inflow of feed in the same or the reverse direction.

The methods of the invention may be modified by terminating the inflow of feed before commencing the gaseous backwash step to effect a dry backwash. The feed flow may also be replaced by a high or low pressure gas through the inlet to the shell so as to assist the discharge of the retained solids.

All the above variations in the mode of operating the filter during the cleaning cycle may be repeated a number of times during gaseous cleaning.

In one form of the invention, the shell is pressurized by terminating feed flow before the pressure variation step and the pressure is released by recommencing feed outflow prior to the application of the pressure variation step.

In a modification of this form of the invention, the pressure is released at both the feed and recirculation ends of the shell.

The methods of the invention may also be modified by including a step of pressurizing the fibres after the completion of the backwash and then releasing that pressure to remove trapped air from the pores of the fibres. The step of pressurizing the fibres may be carried out by terminating the feed inflow and feed outflow and the pressure may be released by recommencing feed inflow with or without recommencement of feed outflow. The pressurization of the fibres is carried out whilst lumen flow is blocked preferably in a pulsing fashion.

To carry out the pressurization, after the backwash cycle has been completed, the feedstock and filtrate flow are blocked. A hydraulic pressure preferably from a piston of pressurized gas is applied to either the filtrate side of the fibres or the feedstock side of the fibres, or both. Thus pressure is applied to the fibres and the compressible gas contained in the pores of the fibres is reduced in volume or dissolved in the liquid in the fibres due to its greater solubility under pressure. On resumption of feed flow the gas is expelled In some circumstances it may be preferable to drain the fibre lumens before commencement of the gaseous backwash step. Furthermore, it may be advantageous to drain the shell before commencement of backwash.

According to another aspect of the invention, the introduction of the pressurized gas for cleaning includes the steps of:

(a) initially applying the gas at a pressure below the bubble point of the walls of the fibres so as to displace any liquid from the fibre lumens, (b) terminating feed inflow and outflow, (c) increasing the pressure of the gas above the bubble point of the walls of the fibres, and, (d) recommencing feed inflow and outflow to allow the trapped gas to escape substantially uniformly through the fibre walls.

Preferably, the introduction of the pressurized gas during the dry backwash includes the steps of:

(a) introducing another gas into the shell side of the fibres at a pressure substantially the same as the lumen cleaning gas, (b) terminating the flow of the shell side gas, opening the shell inlet and/or shell outlet to release the gas pressure on the shell side of the fibres and to allow the lumen gas to escape substantially uniformly through the fibre walls.

The filter may be operated in a cross flow mode or in a dead-end filtering mode with no outflow of feed and solids from the shell, during the dead-end filtration mode.

In yet another embodiment of the invention, the backwashing cleaning step is enhanced by discharging through both the shell inlet and outlet and feeding through an additional line connected to the shell between the shell inlet and outlet.

The invention also includes apparatus for carrying out the methods described above.

In order that the invention may be more readily understood and put into practical effect, reference will now be made to the accompanying drawings in which:

FIG. 1 is a schematic view of a hollow fibre cross-flow filter shown in its operating mode, FIG. 2 is a schematic view similar to FIG. 1 with the filter shown in its gas backwash cleaning mode, FIG. 3 is a graph of clarified liquid flux against time for a hollow fibre cross-flow concentrator, FIG. 4 is a partly broken away view of one end of the filter cartridge shown in FIGS. 1 and 2, FIG. 5 is a view similar to FIG. 4 of a modified form of the cartridge end, FIG. 6 is a view similar to FIG. 4 of a further modified form of the cartridge end, FIG. 7 is a schematic diagram of a filtering installation for the application of the method of the invention, FIG. 8 is a simplified schematic diagram of a modified form of the installation shown in FIG. 7, FIG. 9 is a graph of filtrate flux against time for a filtration system for three modes of operation, FIG. 10 is a graph of filtrate flux against time for a filtration system comparing two modes of operation, FIG. 11 is a graph of flux against time for the filtration of a feedstock using mode 1(b) backwash, FIG. 12 is a graph of flux against time similar to FIG. 11 but showing a mode 2(b) backwash, and, FIG. 13 is a graph similar to FIG. 12 but with four cycles of reverse flow of feedstock followed by a backwash of mode 2(b).

DESCRIPTION OF THE PREFERRED EMBODIMENTS

Figure 3:
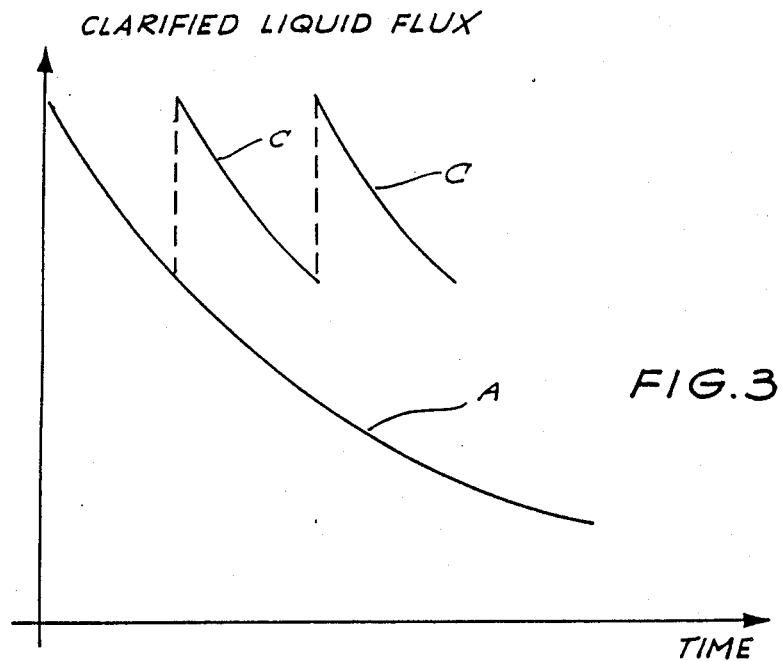

The hollow fibre cross-flow concentrator 10 shown in FIGS. 1 and 2 includes a cartridge shell 11 within which is positioned a bundle of hollow, porous, polymeric fibres 12. In this instance, each fibre is made of polypropylene, has an average pore size of 0.2 microns, a wall thickness of 200 microns and a lumen diameter of 200 microns. There are 3,000 hollow fibres in the bundle 12 but this number as well as the individual fibre dimensions may be varied according to operational requirements.

Polyurethane potting compound 13, 14 holds the ends of the fibres 12 in place without blocking their lumens and closes off each end of the shell 11. The liquid feed suspension to be concentrated is pumped into the shell 11 through feed suspension inlet 15 and passes over the external walls of the hollow fibres 12. Some of the feed suspension passes through the walls of the fibres 12 into the lumens of the fibres to be drawn off through the lumen outlet posts 16 and 18 as clarified liquid.

The remaining feed suspension and some of the rejected species flows between the fibres 12 and leaves the shell 11 through outlet 17. The remainder of the rejected species is held onto or within the fibres or is otherwise retained within the shell.

In order to remove the retained species, lumen outlet port 16 is closed so that the flow of clarified liquid is stopped. Pressurized clarified liquid is then introduced into the lumens through lumen inlet port 18 to stretch substantially all of the pores and to wash them with at least the total pore volume of clarified liquid. Upon completion of the clarified liquid purge, compressed gas is introduced through lumen inlet port 18, along the lumens of the fibres 12 and through the walls of the fibres into the feed suspension/concentrated steam causing violent bubbling which purges the shell of any retained species which may have built up on the outer walls of the fibres or may have been washed from within the pores of the fibres by the clarified liquid purge.

In one embodiment of the invention (which is particularly suitable for long thin fibres), the compressed gas is introduced through inlet 18 and along the lumens of the fibres 12 after opening the lumen outlet port 16 for a period sufficient for all the liquid to be removed from the lumens through no gas penetrates the pores of the fibres at this stage. The port 16 is then closed and the liquid-filled shell is sealed by closing shell inlet 15 and shell outlet 17. Gas still cannot penetrate the porous walls even though the gas pressure is now raised well above the normal bubble point of the fibre walls because the liquid within the shell is relatively incompressible. A reservoir of high pressure gas is thus accumulated in the fibre lumens.

The shell outlet 17 is then opened which allows gas to penetrate the pores along the whole length of each fibre. Initially, the surge of bubbling gas is substantially uniform but ultimately is slower at the end remote from lumen inlet port 18 due to the viscous pressure drop along the thin fibres. In extreme cases, it is desirable to admit gas through both lumen ports 16 and 18 after carrying out the above described pressurized, trapped gas operation.

It is preferred that the resumption of feed suspension flow after gaseous cleaning be delayed for sufficient time to enable the pores that have been stretched by the gas to recover to their original size so that over-sized particles from the feed suspension will not be able to pass into or through the enlarged pores.

FIG. 3 shows the effect of the solid discharges described in relation to FIG. 2 upon the rate of production of clarified liquid. Curve A shows the decay of clarified liquid flux against time without discharge of solids, whereas Curve C show the recovery of clarified liquid flux after each combined liquid and gaseous discharge cycle. Although the discharge of solids returns the clarified liquid flux to almost the initial value, a decrease in efficiency may occur over an extended period of time notwithstanding successive discharges. The slight reduction in the filtration capacity of the fibres at each stage eventually results in a need for chemical cleaning, which is expensive and time consuming.

Figure 4:
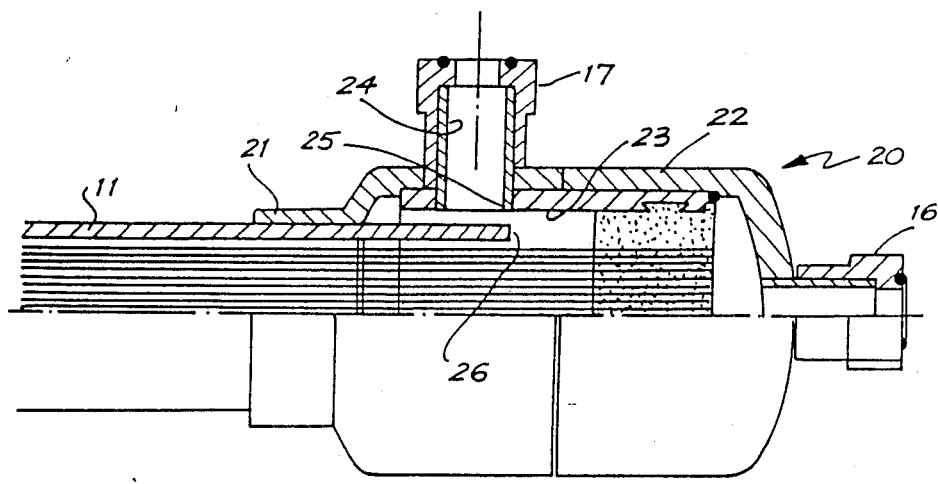

One end of the filter cartridge shown in FIGS. 1 and 2 is shown on an enlarged scale in FIG. 4. It will be seen that the tubular shell 11 projects into a housing 20 that carries the feed suspension outlet 17 and filtrate discharge port 16. The housing 20 is made of two parts 21, 22 within which is located a collar 23 that supports a spigot 24 leading to the outlet 17. In this embodiment of the cartridge, the inner end 25 of the spigot 24 is flush with the inner surface of the collar 23 and the shell 11 projects into housing part 21 with its end 26 terminating beyond the spigot 24.

Figure 5:
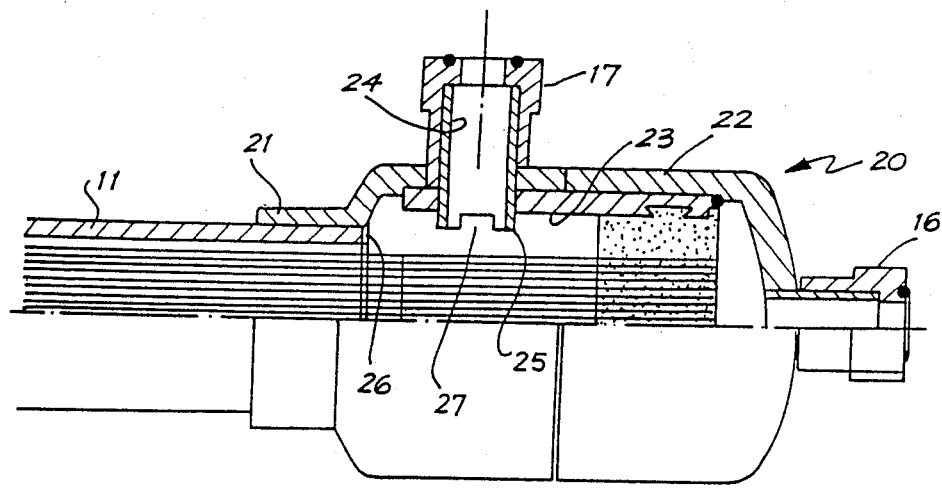

The modified version of the end of the cartridge shown in FIG. 5 is substantially similar to that shown in FIG. 4, the differences being that the inner end 26 of the shell 11 does not project into the housing part 21 and that the inner end 25 of the spigot 24 projects beyond the inner surface of the collar 23 and that the inner end 25 of the spigot has a cut-away portion 27.

Figure 6:
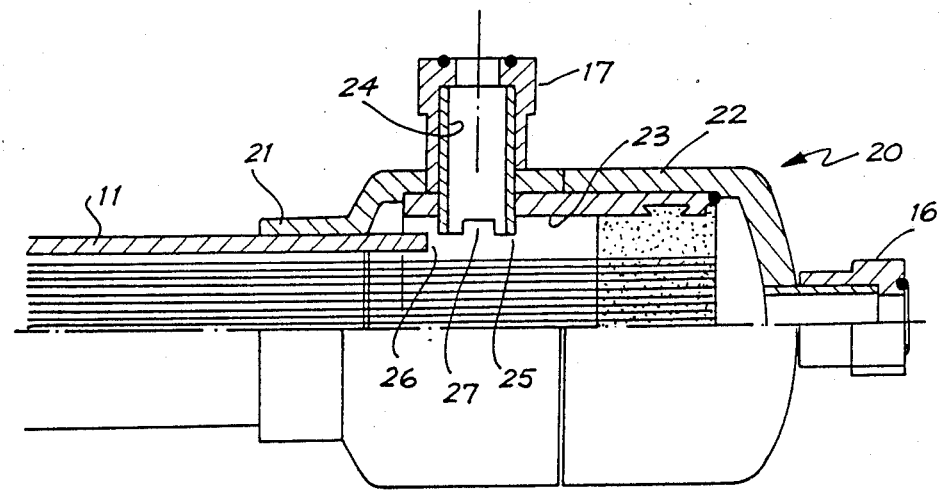

The modified version of the end of the cartridge shown in FIG. 6 is substantially similar to that shown in FIG. 5, the difference being that the inner end 26 of the shell 11 does project into housing port 21 but terminates short of the spigot 24.

Figure 7:
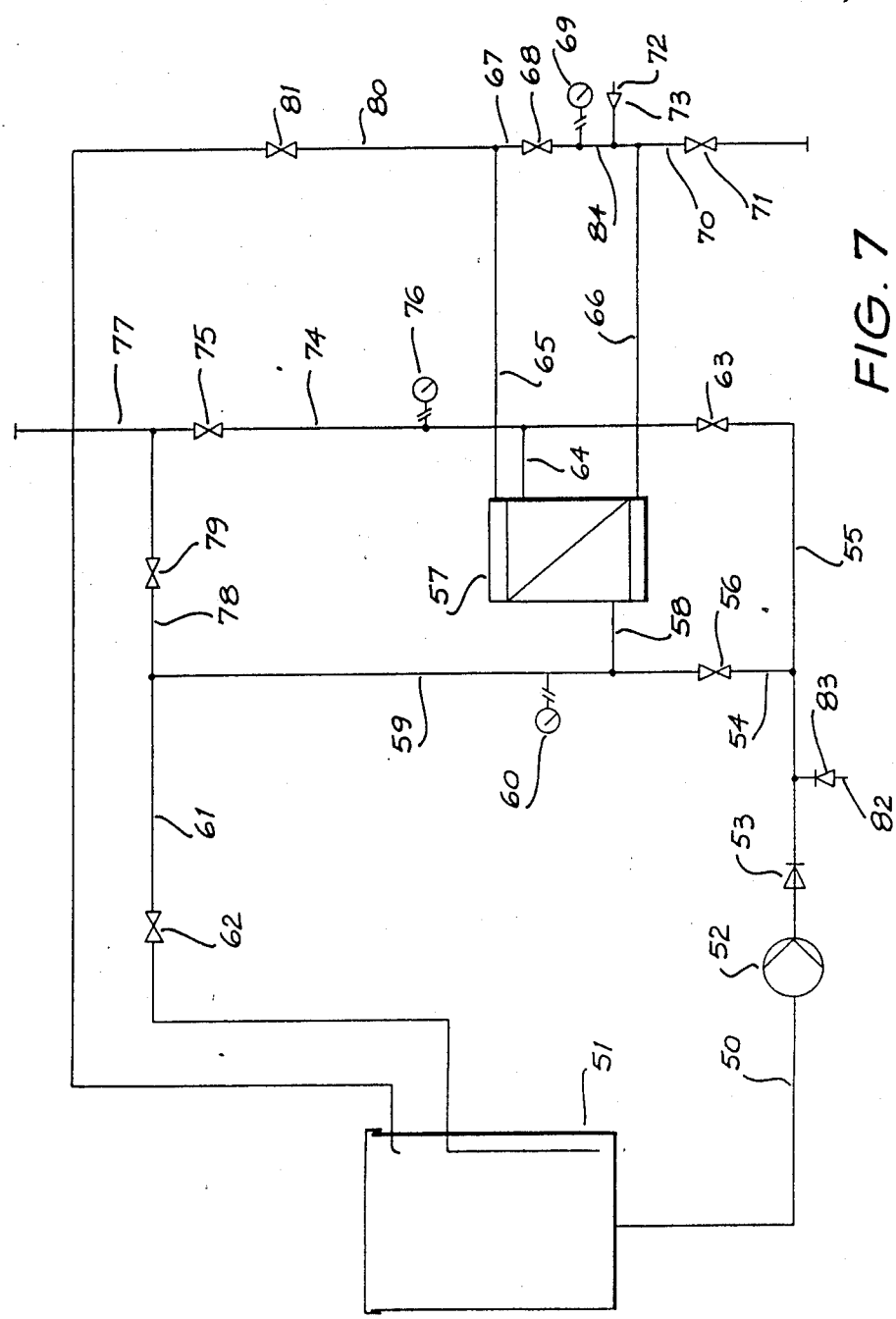

The techniques of the invention can be implemented using the installation shown in FIG. 7. In FIG. 7, feed line 50 from the tank 51 to feed pump 52 and check valve 53 branches into lines 54 and 55. Manual valve 56 in line 54 is closed during normal filtration. Feed in line 55 passes through feed valve 63 and into the shell side of filter 57 through feed line 64. Feed discharged from the filter 57 flows through line 58 into line 59 having a pressure gauge 60 and then into the main return line 61 which has a manual control valve 62.

Filtrate from the filter 57 is discharged through filtrate lines 65 and 66. Filtrate from line 65 passes through line 67 which has a manual control valve 68 and line 84 which has a pressure gauge 69 to filtrate discharge line 70 which also has a manual control valve 71. Filtrate from line 66 is also discharged through line 70.

Gas may be introduced into line 84 from line 72 which contains a check valve 73. A discharge line 74 is connected to the feed line 64 and contains a manual drain valve 75 and pressure gauge 76. The discharge line 74 is connected to the main discharge line 77 as is line 78 which has a manual drain valve 79. A return line 80 connected between the filtrate lines 65 and 67 and tank 51 has a manual valve 81. An additional gas line 82 controlled by valve 83 enters feed line 50 downstream of the check valve 53.

During normal filtration pump 52 is on and valves 63, 71, 68 and 62 are all open and valves 56, 79, 75 and 81 are closed. Desired operating pressures are set by adjusting manual valves 63 and 62.

The filter installation shown in FIG. 7 can operate in a number of different modes of backwashing by manipulating the various valves, altering the flow pattern and by changing the identity (liquid or gas) of the medium in one, some or all of the lines.

In brief terms, these modes of backwash may be identified as:

| | |
|---|---|
| MODE 1 | NORMAL BACKWASH |
| MODE 2 | PRESSURE INCREASE WITH REVERSE FLOW OF FEED DURING BACKWASH |
| MODE 3 | PRESSURE DECREASE WITH PULSING FEED INFLOW |
| MODE 4 | PRESSURE INCREASE WITH PULSING FEED OUTFLOW |
| MODE 5 | PRESSURE DECREASE WITH REVERSE FLOW OF FEED |
| MODE 6 | RELEASING SHELL PRESSURE AT BOTH INLET AND OUTLET POINTS DURING BACKWASH |
| MODE 7 | NO LIQUID FEED FLOW DURING BACKWASH (DRY BACKWASH) |
| MODE 8 | REWETTING PRESSURISATION |

All the first seven modes may be effected by either first draining the lumens or not draining the lumens. Thus, the above modes will be identified as (a) when the lumens are drained and (b) where the lumens are not drained where such distinction is appropriate.

It is convenient to describe Mode 2 before Mode 1 as the latter consists of seven stages which are common to the ten stages of Mode 2.

MODE 2 - PRESSURE INCREASE WITH REVERSE FLOW OF FEED

The reverse flow of feed during backwash mode consists of ten stages. During stage 1, pump 52 is off, valves 63, 56, 79, 75, 71, 68 and 62 are closed and valve 81 is open. Low pressure gas is introduced via line 72 and check valve 73. The gas flows through lines 84 and 66 and into the bottom filtrate port of cartridge bank 57. Filtrate from within the lumens is flushed out and exits via lines 65 and 80 back to tank 51. During this stage, the gas pressure is held low, below the bubble point, so that there is no gas breakthrough across the membrane.

During stage 2, pump 52 remains off, valve 73 remains open and valves 63, 56, 79, 75, 71 and 62 remain closed. Valve 81 is closed and valve 68 is opened. High pressure gas is then introduced via lines 72, 67, 84, 66 and 65. This pressurizes both the lumen side and the shell side of the cartridge bank 57, typically to 600KPa(g).

During stage 3, pump 52 remains off, valves 63, 56, 75, 71, 81 and 62 remain closed and valves 68 and 73 remain open. Valve 79 is opened to release the shell side pressure with high pressure gas still being applied to the lumens via lines 72, 67, 84, 66 and 65. The gas passes through the pores of the fibres to the shell side of the filter 57 and exits via lines 58, 59, 78 and 77. The purpose of this third stage is to dislodge accumulated solids from the outside of the fibres.

During stage 4, the valve settings are the same as for Stage 3 except for valve 63 which is now opened. Pump 52 is turned on and remains on until the next backwash sequence is started. High pressure gas is still applied to the lumens via lines 72, 67, 84, 66 and 65. The purpose of this fourth stage is to wash dislodged solids to drain, via lines 58, 59, 78 and 77.

During stage 5, valves 68 and 73 remain open and valves 56, 71, 75, 81 and 62 remain closed. Valves 63 and 79 are closed and high pressure gas is still applied to the lumens via lines 72, 67, 84, 65 and 66 which pressurizes both the lumens and the shell side of the cartridge bank 57.

During stage 67, the valve settings are the same as for Stage 5 except for valves 56 and 75 which are opened to release the shell-side pressure with high pressure gas still applied to the lumens. The flow of feed down the cartridge bank 57 is now reversed, and the dislodged solids are carried away via lines 64, 74 and 77.

The seventh stage is the same as the fifth stage and the eighth stage is the same as the fourth stage. The total sequence of stages 4, 5, 6, 5, 4 is repeated one or more times.

Stage 9 is the same as stage 4 except the high pressure gas is turned off to remove residual gas in the feed stream to drain via lines 58, 59, 78 and 77.

For stage 10, valves 63, 68 and 81 are open, valves 56, 79, 75, 71 and 62 are closed and the high pressure gas remains off to remove residual gas in filtrate lines 65, 66, 67, 84 and 80. At the completion of stage 10, the installation is returned to normal filtration.

MODE 1 - NORMAL BACKWASH

The normal backwash mode consists of stages 1 to 4 and 9 to 10 of Mode 2. Thus, during stage 1, low pressure gas is introduced into the lumens to drain filtrate from the lumens. During stage 2, the gas pressure is increased to pressurize both the lumen side and the shell side of the filter 57.

At stage 3, drain valve 79 is opened to release the shell side pressure whilst high pressure gas is still being applied to the lumens to dislodge accumulated solids from the outside of the fibres. Feed valve 63 is opened and the pump 52 turned on in stage 4 to wash the dislodged solids through drain valve 79 to discharge line 77.

The high pressure gas is then turned off (stage 9) and residual gas in the feed stream is discharged through lines 59 and 78 to discharge line 77. In the final stage (stage 10), residual gas in the filtrate lines 65, 66 and 67 is discharged through line 80 to the tank 51. At the completion of stage 10, the installation is returned to normal filtration.

MODE 3 - PRESSURE DECREASE WITH PULSING FEED INFLOW

In this mode, stages 1 to 4 are the same as those described above in relation to Mode 2. Thus, low pressure gas is used to drain the lumens (stage 1), high pressure gas is used to pressurize both the lumen side and the shell side of the filter (stage 2), drain valve 79 is opened to release the shell side pressure to dislodge accumulated solids (stage 3) and feed flow recommenced through feed valve 63 to wash the solids through the drain valve 79 to discharge line 77 (stage 4.).

Stage 5 is the same as stage 4 except that the feed valve 63 is closed to drop the shell side pressure of the cartridge 57 below the normal gaseous cleaning pressure.

Stage 6 of this mode is the same as stage 4, that is, valve 63 is opened so that the pressure on the shell side returns to the normal gaseous cleaning pressure. Stage 7 of this mode is the same as stage 5 and stage 8 of this mode is the same as stage 4.

The total sequence of stages 4, 5, 4 in order (i.e. stages 4 to 8) is repeated one or more times. Stages 9 and 10 of this mode are the same as stage 9 and 10 of Mode 2.

MODE 4 - PRESSURE INCREASE WITH PULLING FEED OUTFLOW

In this mode, stages 1 to 4 are the same as Stages 1 to 4 of Mode 2.

Stage 5 of this mode is the same as stage 4 of this mode except that drain valve 79 is closed so that the pressure on the shell side of the filter cartridge 57 is increased from the normal operating gaseous cleaning to the pressure on the lumen side.

Stage 6 of this mode is the same as stage 4 of this mode. Thus, valve 79 is opened and feed flow recommenced. The pressure on the shell side of the cartridge drops back to the normal gaseous cleaning pressure.

Stage 7 of this mode is the same as stage 5 of this mode and stage 8 of this mode is the same as stage 4 of this mode.

The total sequence of stages 4, 5, 4 in order (i.e. stages 4 to 8) is repeated one or more times with the action to initiate the pressure variation cycle always being applied at the same end of the shell. Stages 9 and 10 are the same as stages 9 and 10 of Mode 2.

MODE 5 - PRESSURE DECREASE WITH REVERSE FLOW OF FEED

This mode follows stages 1 to 5 of Mode 3. In stage 6, valves 56, 75 and 68 are open and valves 63, 79, 73, 81 and 62 are closed. Pump 52 is on and high pressure gas is still applied through line 72. Dislodged solids are removed through lines 64, 74 and 77.

Stage 7 of this mode is the same as stage 5 of Mode 3 and stage 8 of this mode is the same as stage 4 of Mode 3.

The total sequence of stages 4, 5, 6, 5, 4 in order (i.e. stages 4 to 8) is repeated one or more times.

It should be noted that the pressure cycle introduced after stage 4 of Modes 2 to 5 can be either pressure increases from normal gaseous cleaning pressure and, then returns to the normal gaseous cleaning pressure (Modes 2 and 4), or, pressure decreases from normal gaseous cleaning pressure, and then returns to normal gaseous cleaning pressure Modes 3 and 5).

With Modes 2 and 4, after the pressure increase, the pressure release is always at the feed outflow end of the shell. With Mode 4, the feed outflow is always at the same end of the shell with Mode 2, the feed outflow alternates from one end of the shell to the other on each cycle.

With Modes 3 and 5, the pressure cycle is always initiated at the feed inflow end of the shell. With Mode 3 the feed inflow is always at the same end of the shell. With Mode 5 the feed inflow alternates from one end of the shell to the other on each cycle.

MODE 6 - RELEASING SHELL PRESSURE AT BOTH INLET AND OUTLET POINTS DURING BACKWASH

This mode can be applied to Modes 1 to 5. The pressure release refers to the release of the pressure built up within the shell during stage 2 of Modes 1 to 5 which is different from the pressure variation cycle introduced after stage 4. To achieve the release of pressure at both the inlet and outlet points of the shell stage 3 is modified by additionally opening valve 75 to equalize the trans membrane pressure down the filter cartridge bank 57.

MODE 7 - NO LIQUID FEED FLOW DURING BACKWASH(DRY BACKWASH)

In this mode, the feed pump 52 is off for the entire backwash cycle to effect a dry blow back mode and dry blow back gas dislodges accumulated solids and carries these solids away to drain.

The dry blow back mode can be applied using the stages of Mode 2, Mode 3, Mode 4 and Mode 5 with or without Mode 6 by replacing flow of liquid feed with a flow of high pressure gas through line 82 and check valve 83 and line 50 in all relevant stages of Mode 2, Mode 3, Mode 4 and Mode 5 with or without Mode 6.

A modification of Mode 7 can be made in Stages 1 and 2. In this modification gas at approximately the same pressure as that applied to the lumens is simultaneously applied to the shell as a means of pressurizing both the lumen side and the shell side of the cartridge bank. This can be achieved by opening valves 63 and 56 and applying gas through line 82 and check valve 83. In stage 3, valve settings return to those of stage 3, Mode 2, and the gas to the shell is discontinued.

In a further modification cf Mode 7, which can, be applied to Mode 2 and Mode 4 with or without Mode 6, there is no feed flow and no secondary gas flow through line 82.

Thus, the dry blow back mode 7 can be effected in a number of sub modes as follows:

| Sub Mode | Parent Mode | Lumen Drained |
| --- | --- | --- |
| 7(a) | 1a | Yes (a) |
| 7(b) | 1b | No (b) |
| 7(c) | 2a | Yes (a) |
| 7(d) | 2b | No (b) |
| 7(e) | 3a | Yes (a) |
| 7(f) | 3b | No (b) |
| 7(g) | 4a | Yes (a) |
| 7(h) | 4b | No (b) |
| 7(i) | 5a | Yes (a) |
| 7(j) | 5b | No (b) |

In addition sub Modes 7(a) to 7(j) may be carried out with the shell drained (sd) or with the shell not drained (snd).

MODE 8- REWETTING PRESSURIZATION

A rewetting of the membranes stage can follow any of the above modes. The rewetting stage may be applied when a backwash cycle is complete, or at any other time. The rewetting cycle consists of subjecting the fibres to a pressurization followed by a fast release of pressure to remove trapped air which is blocking the fibres. This can be achieved in the following three steps:

In step 1, valves 79, 75, 71, 81 and 62 are closed, valves 63, 56 and 68 are open and high pressure gas is introduced to the filtrate side of cartridge 57 via lines 72, 67, 84, 65 and 66. This pressurizes both the lumen side and the shell side of cartridge 57.

In step 2, the flow of high pressure gas is stopped and all valve settings are the same as for step 1 except that valve 81 is open. This releases the pressure inside cartridge 57, removing trapped bubbles of gas from within the fibres. Step 3 is a return to normal filtration.

A modification of the rewetting Mode 8 is to introduce the high pressure air on the shell side instead of the filtrate side of cartridge 57. This can be achieved in the following three steps:

In step 1, valves 79, 75, 71, 81 and 62 are closed, valves 63, 56 and 68 are open and high pressure gas is introduced to the shell side of cartridge 57 via lines 82, 50, 54, 55, 64 and 58 to pressurize both the shell and the lumen sides of cartridge 57.

In step 2 the flow of high pressure gas is stopped. All valve settings are the same as for Step 1 except that valve 79 is open to release the pressure inside cartridge 57 and removes trapped bubbles of gas from within the fibres. Step 3 is a return to normal filtration. The rewetting pressurization cycle may be performed one or more times.

The combination of the backwash and reversal of the direction of flow produces an effect that is greater than that expected by the addition or supposition of the results of backwashing on the results of reversing the direction of the flow of feed. The result is somewhat unexpected but is possible because the application of the technique, as has been observed in transparent shell cartridges, establishes new flow patterns, thereby reducing the self-increasing effect of blocked cartridges that was discussed earlier The increased turbulence created by the simultaneous application of the two techniques clears blockages from the cartridge instead of allowing material to build up on previously deposited material.

During the filtering stage where flow is in one direction, there is a small pressure drop in feedstock pressure along the cartridge. This difference in pressure between distal and proximal ends of the cartridge increases during the application of the gaseous backwash. Thus the gas at the distal end of the cartridge faces a lower transmembrane pressure drop than the gas at the proximal end of the cartridge, and more bubbles pass through the fibre walls at the distal end of the cartridge. The reversal of the direction of the flow of feed applied during gaseous backwash reverses the pressure difference effect and allows a more even distribution of bubbles passing through the walls of the fibres.

The relative effectiveness of the liquid and gaseous backwashes and of reversal of the direction of flow of the feedstock depends on the nature of the suspension being filtered. Caking deposits are better removed by gaseous backwash combined with a reversal of direction of flow of feedstock. Indeed it is for such deposits that form clots that the technique is particularly successful when compared with other methods. Backwash alone loosens the retained solids which are then quickly redeposited on the fibres as soon as filtration is recommenced. The application of reversal of direction of flow of feed creates turbulence along the outer walls of the fibres and carries away the clotted solid material.

Figure 8:
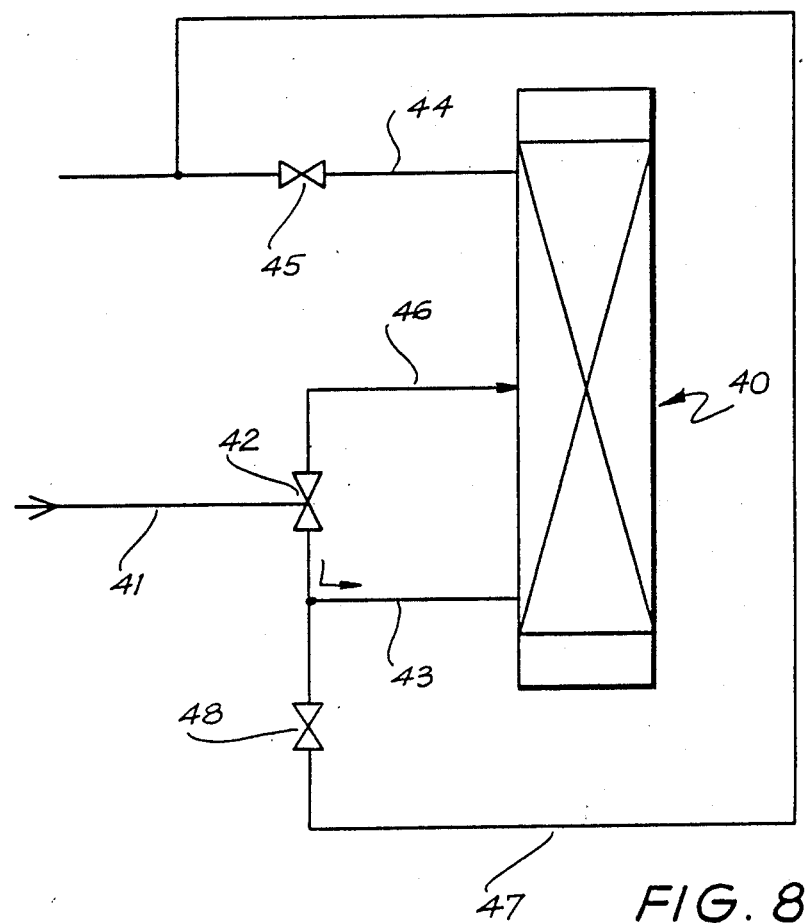

FIG. 8 shows a modified installation substantially similar to that of FIG. 7 and, as such, most components have been omitted. Feed to the shell 40 is applied through line 41 and a three-way valve 42 to feed inlet 43. Feed is discharged from the shell through feed outlet line 44 having a valve 45. Valve 48 is closed during the filtering operation.

A third port is connected to line 46 leading from the feed inlet valve 42. Discharge line 47 having a valve 48, is connected between the feed inlet 43 and feed outlet line 44 downstream of the discharge valve 45.

With such a filter, the method described in respect of the FIG. 7 installation is modified in that after the release of the pressure on the outer surface of the fibres (i.e. after stage 3 of Mode 2), the feed from the pump is directed to the third port through line 46 so as to flush out both ends of the shell or housing through discharge line 47 in the case of the inlet end of the shell and through the normal feed outlet line 44 at the other end of the shell.

In order that the invention may be more readily understood, reference will now be made to the following examples which were carried out using installations having sufficient of the features of the installation of FIG. 7 to enable the particular Mode to be effected.

In all cases, the filter cartridge contained a bundle of about 3,000 polypropylene hollow fibres with feed being applied in a cross-flow fashion to the outer surface of the fibres and filtrate being withdrawn from each end of the fibre lumens. The cartridge end design of FIG. 4 was used in Examples 1 to 6 and 9, that of FIG. 5 was used in Examples 7 and 8 and that of FIG. 6 was used in Examples 10 and 11.

EXAMPLE I: MODES 1(b), 2(b) and 4(b)

This experiment was conducted to compare the effectiveness of the normal Mode 1(b), the reverse flow Mode 2(b), and the pulsed Mode 4(b).

A suspension containing ferric hydroxide was made by mixing 360 ml "Ferriclear" and 1080 g sodium hydrogen carbonated in 20 litres water, to precipitate 199.8 g ferric hydroxide.

In the normal mode (1b), the feed inlet pressure was 50 KPa and the feed outlet pressure zero. Air at 600 KPa was blown back for 6 seconds. The total time of the backwash and air removal was 40 seconds. The cycle of Mode 1(b) followed by mode 8 was repeated every 10 minutes.

Backwash Modes 2(b) and 4(b) were carried out.

After each of the above modes, the filter was subjected to rewetting mode 8.

Figure 9:
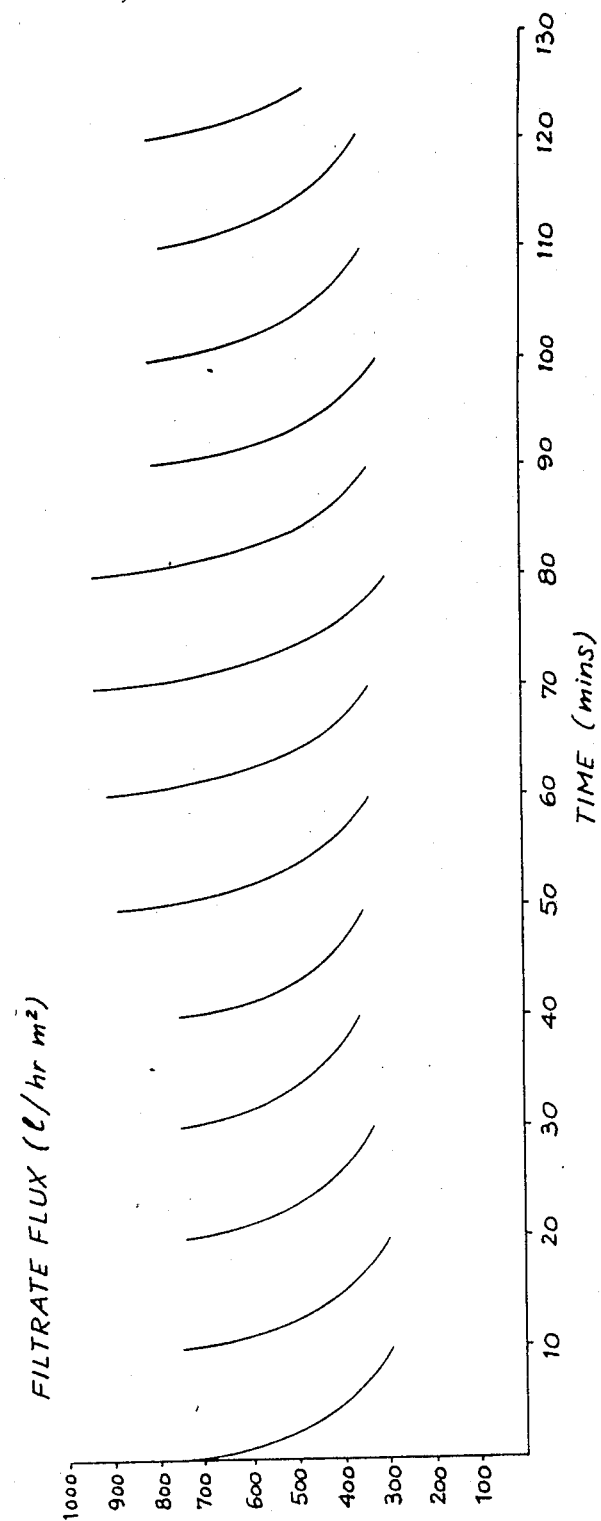

The three modes may be compared by comparing the filtrate flow rates after 10 minutes, and recovery after air blowback for several consecutive cycles. The results are set forth in Table I where:

1(b) is the normal mode, with lumens not drained 2(b) is the pressure increase with reverse flow of feed mode, with lumens not drained 4(b) is the pressure increase with pulsing feed outflow mode, with lumens not drained It can be seen from the following Table I that Mode 2(b) recovered the filtrate flow rate (flux) to a higher value than Mode 4(b) and that this was in turn more effective than Mode 1(b). The results are shown in FIG. 9.

TABLE I

| Time Mins | Flux 1/hr | Backwash Mode applied after 10 min |
|---|---|---|
| 0 | 740 | |
| 10 | 295 | 1(b) |
| 0 | 760 | |
| 10 | 300 | 1(b) |
| 0 | 750 | |
| 10 | 330 | 1(b) |
| 0 | 760 | |
| 10 | 360 | 1(b) |
| 0 | 760 | |
| 10 | 360 | 2(b) |
| 0 | 900 | |
| 10 | 335 | 2(b) |
| 0 | 920 | |
| 10 | 340 | 2(b) |
| 0 | 950 | |
| 10 | 300 | 2(b) |
| 0 | 950 | |
| 10 | 340 | 4(b) |
| 0 | 820 | |
| 10 | 320 | 4(b) |
| 0 | 815 | |
| 10 | 345 | 4(b) |
| 0 | 810 | |
| 10 | 360 | 4(b) |
| 0 | 830 | |
| 10 | 360 | Nil |

EXAMPLE 2 MODES 1(b), 4(b) and 2(b)

A mixture of 50 g diatomite ("Whitco") and 50 g bentonite in 20l water was filtered repeatedly to test the effectiveness of the modes of backwashing. All feed, filtrate and backwashed material was returned to the feed tank. The temperature of the feed was kept constant in the range of 25.5° C. to 26° C. by a copper coil heat exchanger using cold tap water. The modes tested were the normal backwash, Mode 1(b), the pulsed mode 4(b) and the reverse flow Mode 2(b). Each backwash was followed by rewetting sequence mode.

The results in which the time taken to apply the backwash has been deleted from the time figures are shown in Table II where:

1(b) is the normal mode, with lumens not drained

4(b) is the pressure increase with pulsing feed outflow mode, with lumens not drained 2(b) is the pressure increase with reverse flow of feed mode, with lumens not drained

TABLE II

| Time (mins) | Flux (1/hr) | Backwash Mode |
|---|---|---|
| 0 | 850 | |
| 10 | 420 | 2(b) |
| 10 | 840 | |
| 20 | 420 | 2(b) |
| 20 | 830 | |
| 30 | 400 | 2(b) |
| 30 | 830 | |
| 40 | 420 | Nil |
| 0 | 850 | |
| 10 | 425 | 1(b) |
| 10 | 800 | |
| 20 | 405 | 1(b) |
| 20 | 780 | |
| 30 | 410 | 1(b) |
| 30 | 750 | |
| 40 | 405 | Nil |

TABLE II-continued

| Time (mins) | Flux (l/hr) | Backwash Mode |
|---|---|---|
| 0 | 850 | |
| 10 | 400 | 4(b) |
| 10 | 820 | |
| 20 | 400 | 4(b) |
| 20 | 800 | |
| 30 | 395 | 4(b) |
| 30 | 800 | |
| 40 | 395 | Nil |

EXAMPLE 3 MODES 4(b) and 2(b)

A feedstock consisting of muddy water with a turbidity of 420 NTU was used in carrying separate examples in respect of Mode 4(b) and Mode 2(b) each of which was followed by Mode 8. All filtrate and solid material blown off by the backwash was returned to the feed tank. The filtrate at all times was optically clear.

The filtration time between backwashes was 7 minutes. Each backwash took a total of about one and a half minutes to apply, however air only passed through the membrane for ten seconds.

Figure 10:
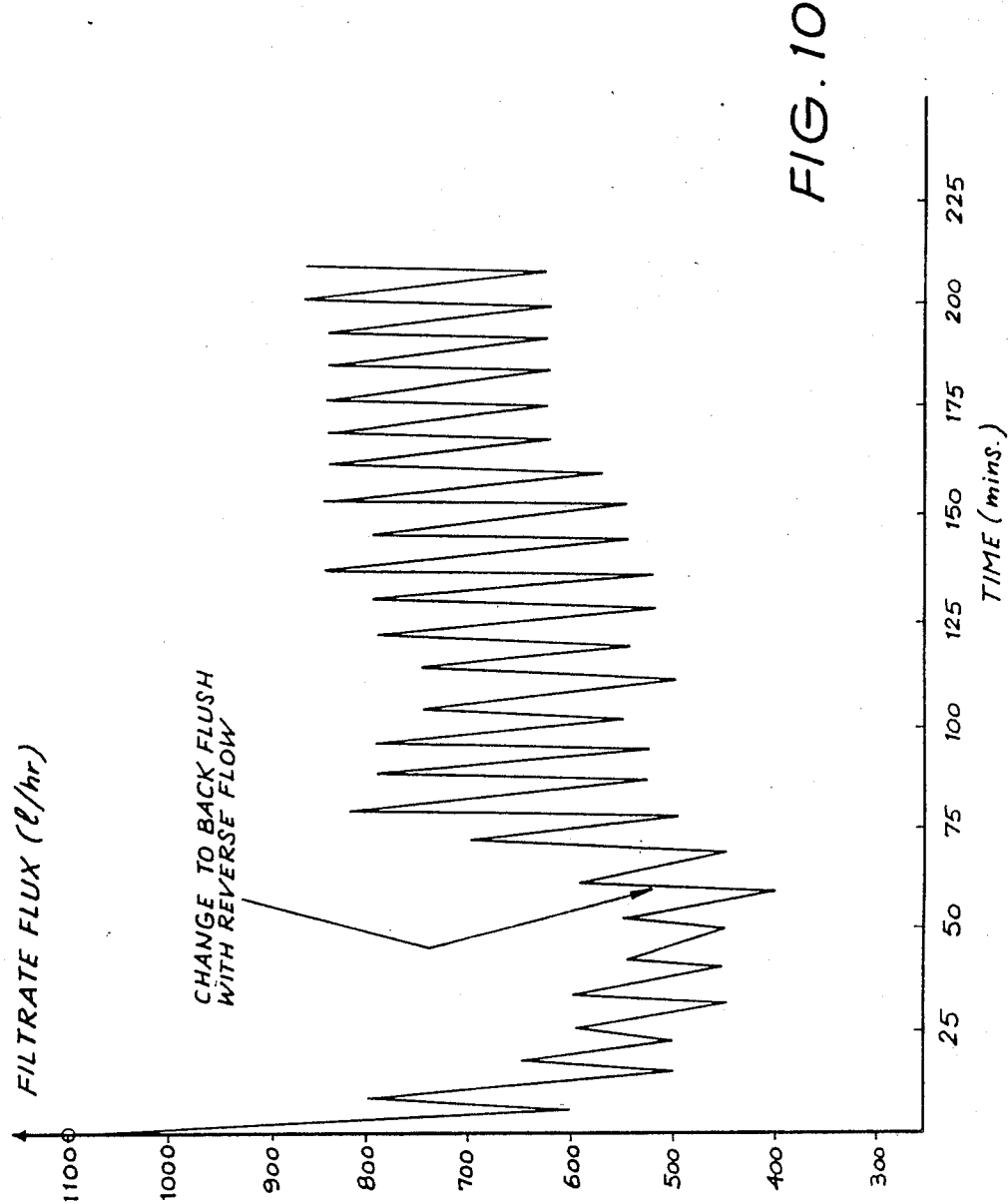

The results are given in the following Tables III and IV and are graphed in FIG. 10.

TABLE III
PRESSURE INCREASE WITH PULSING FEED OUTFLOW MODE (4b)

| Time (mins) | Filtrate Flow Rate (Liters/hour) |
|---|---|
| 0. | 1100 |
| 7.0 | 600 |
| Backwash | |
| 8.75 | 800 |
| 16.0 | 500 |
| Backwash | |
| 17.45 | 650 |
| 23.25 | 500 |
| Backwash | |
| 25.5 | 600 |
| 32.0 | 450 |
| Backwash | |
| 33.75 | 600 |
| 40.5 | 450 |
| Backwash | |
| 42.5 | 550 |
| 50.0 | 450 |
| Backwash | |
| 52.5 | 550 |

TABLE IV
PRESSURE INCREASE WITH REVERSE FLOW OF FEED (Mode 2(b))

| Time (mins) | Filtrate Flow Rate (Liters/hour) | Time (mins) | Filtrate Flow Rate (Liters/hour) |
|---|---|---|---|
| 60.0 | 400 | Backwash | |
| Backwash | | 146.5 | 800 |
| 61.5 | 600 | 154.0 | 550 |
| 70.0 | 450 | Backwash | |
| Backwash | | 155.25 | 850 |
| 71.75 | 700 | 162.0 | 575 |
| 78.5 | 500 | Backwash | |
| Backwash | | 163.1 | 850 |
| 79.8 | 825 | 170.0 | 575 |
| 87.0 | 525 | Backwash | |
| Backwash | | 171.25 | 850 |
| 88.25 | 800 | 178.0 | 575 |
| 95.0 | 525 | Backwash | |
| Backwash | | 179.0 | 850 |
| 96.25 | 800 | 186.0 | 575 |
| 103.0 | 550 | Backwash | |
| Backwash | | 187.25 | 850 |
| 104.75 | 750 | 194.0 | 575 |
| 112.0 | 500 | Backwash | |
| Backwash | | 195.1 | 850 |
| 113.75 | 750 | 202.0 | 575 |
| 121.0 | 550 | Backwash | |
| Backwash | | 203.0 | 875 |
| 122.25 | 800 | 210.0 | 575 |
| 129.0 | 525 | Backwash | |
| Backwash | | 211.0 | 875 |
| 130.5 | 800 | | |
| 137.0 | 525 | | |
| Backwash | | | |
| 138.25 | 850 | | |
| 145.0 | 550 | | |

EXAMPLE 4 MODE 7(b) (snd)

A suspension was made by mixing 50.1 g diatomaceous earth with 20 litres of water and then filtered.

After 10 minutes of cycling, the feed was blocked off at both the feed inlet to and the feed outlet from the cartridge. A backwash of Mode 7(b), shell not drained, was performed. The backwash was collected through the external drain line and filtered. The amount of dry diatomite recovered was 9.2 g. The recovery of diatomite was therefore 18.4%. 1.8 litres of backwash were collected. The dryness of the collected material was therefore 5.11 g/l.

EXAMPLE 5

Three batches of suspension were each made by mixing 48.7 g diatomite with 20 litres of water. The temperature of the feed in the tank was maintained at 25° C. plus or minus 0.2 of a degree.

EXAMPLE 5 - Batch 1 MODE 1(b)

The initial water flux of the cartridge was 650 l/h. The trans membrane pressure was 115 KPa, where the inlet pressure was 200 KPa, the feed outlet pressure was 100 KPa, and the filtrate pressure was 35 KPa. After 10 minutes of recycling the suspension through the filter cartridge as in Example 5, the liquid remaining in the feed tank was quite clear and it was concluded that nearly all the diatomite had been deposited on the outside of the fibres.

Air was blown back through the membrane for about 15 seconds in backwash Mode 1(b). 3.3 litres of backwash was collected yielding 18.8 g of diatomite. The recovery was 38.6%.

Three backwashes were performed with reversal of the direction of the flow of feed during the backwash to remove almost all of the remaining diatomite.

EXAMPLE 5 - Batch 2 MODE 7(d) (snd)

The initial water flux of the cartridge was 680 l/h, the inlet pressure was 200 KPa, the feed outlet pressure was 100 KPa, and the filtrate pressure was 35 KPa. After 10 minutes of filtration of the batch, a backwash of Mode 7(d), shell not drained, was applied Air was blown back for 20 seconds.

2.2 litres of backwash were collected yielding 14.4 g diatomite. The recovery was 29.6%.

Again three reverse flow backwashes were performed to remove remaining diatomite.

EXAMPLE 5 - Batch 3 MODE 7(g) (sd)

This batch was treated as for batch 2 except that before backwashing all feed and filtrate lines were drained carefully so as to avoid disturbing the diatomite on the surface of the fibres. Air was blown back for 1 minute in backwash Mode 7(g). 0.27 litres of backwash were collected yielding 12.5 g diatomite. The recovery was 25.7%.

It can be seem by comparing the dryness of the recovered solids expressed in g/l that Mode 7(g) (sd) gave a much drier material than the modes where the shell was not drained.

| BATCH | MODE | RECOVERY g/l |
|---|---|---|
| 1 | 1b | 5.7 |
| 2 | 7d snd | 6.5 |
| 3 | 7g sd | 46.3 |

EXAMPLE 6

The investigation of Example 5 was repeated with ferric hydroxide solution of pH7 containing 77.7 g ferric hydroxide in 20 litres of water.

The initial water flux of the cartridge was 820 l/h. The feed inlet pressure was 200 KPa, the feed outlet was 100 KPa and the filtrate pressure was 45 KPa The temperature of the feed in the tank was maintained at 25° C. plus or minus half a degree.

EXAMPLE 6 - Batch 1 MODE 2(b)

A 20 second backwash was performed in Mode 2(b). 6.26 litres of backwash were collected with a ferric hydroxide recovery of 44.2%.

EXAMPLE 6 -Batch 2 MODE 7(d) (snd)

The initial water flux was 830 l/hr with temperatures and pressures as before. Air was blown back for 30 seconds in backwash 7(d), shell not drained 1.8 litres of backwash were collected with a ferric hydroxide recovery of 10.9%.

EXAMPLE 6 - Batch 3 MODE 7(g) (snd)

The initial water flux was 830 l/h with temperatures and pressures as before. With the pump turned off and the feed, feed return and filtrate valves closed, the filtrate lines and lumens were carefully drained. Air was blown back for 30 seconds in backwash mode 7(g), shell not drained. 1.8 litres were collected with a ferric hydroxide recovery of 13.3%.

EXAMPLE 6 - Batch 4 MODE 7(c) (sd)

The initial water flux was 820 l/h with temperatures and pressures as before. With the pump off, feed, feed return and filtrate, valves closed, and all lines, lumens and shell side of cartridge were carefully cleared of liquid, air was blown back for about one minute in backwash Mode 7(c), shell drained. 230 ml backwash were collected yielding 7.44 g ferric hydroxide, a recovery of 9.6%.

It may be concluded from these examples that application of mode 7 results in the solids being recovered in a much more concentrated state but sometimes at the expense of percentage recovery.

It can be seen by comparing the dryness of the recovered solids expressed in g/l that Mode 7(c) (sd) gave a much drier material than the modes where the shell was not drained.

| BATCH | MODE | RECOVERY g/l |
|---|---|---|
| 1 | 2(b) | 5.5 |
| 2 | 7(b) (snd) | 4.7 |
| 3 | 7(g) (snd) | 5.7 |
| 4 | 7(c) (sd) | 32.3 |

EXAMPLE 7 MODE 1(a) FOLLOWED BY MODE 8

Tap water was filtered through three separate tube-in-shell filter cartridges each containing about 1m² of polypropylene porous hollow fibres prewetted with alcohol. The conditions of filtration were such as to maintain a trans membrane pressure of 100 KPa. The filtrate flow rate, or flux, was measured before an air backwash of mode 1(a) was applied, and again performing a mode 8 rewetting sequence. The fluxes recorded for each cartridge are shown in the Table V.

TABLE V

| CARTRIDGE | FLUX BEFORE AIR BACKWASH | FLUX AFTER BACKWASH MODE 1(a) | FLUX AFTER PRESSURISATION MODE 8 |
|---|---|---|---|
| 1 | 1000 l/hr | 230 l/hr | 1150 l/hr |
| 2 | 1075 l/hr | 320 l/hr | 1200 l/hr |
| 3 | 730 l/hr | 150 l/hr | 820 l/hr |

The increased flow after pressurization compared with the flow before backwash is a result of the removal by backwash of fouling substances that had accumulated on the surface of the membrane and of air blocking the membrane

EXAMPLE 8 MODE 8

Two new, dry cartridges, similar to those used in Example 7 were separately treated with pressurized water at 600 KPa for 2 to 3 seconds and the filtrate flow rate before and after pressurization is shown in the following Table VI.

TABLE VI

| CARTRIDGE | FLUX BEFORE MODE 8 | FLUX AFTER MODE 8 |
|---|---|---|
| 1 | 0 l/hr | 1250 l/hr |
| 2 | 0 l/hr | 1325 l/hr |

EXAMPLE 9 MODES 1(a) and 2(a)

A one square metre MEMTEC cross-flow cartridge filter was run in dead-end mode, i.e. no recirculation. The feed stream was mains tap water having a typical turbidity of 6 NTU pH of 7.5 to 8. All tests were performed at approximately 200° C. With the feed recirculation valve closed, a pressure regulating valve placed on the feed inlet was adjusted to give a shell-side pressure of 250 KPa(g). Two backwashes were tested with the intervals-between backwashes approximately six hours. The backwashes tested were:

1(a) Normal backwash mode
2(a) Pressure increase with reverse flow of feed mode
The results are set out in TABLE VII.

TABLE VII

| Case (i) Normal Backwash - Mode 1(a) | | | | | | | | |
|---|---|---|---|---|---|---|---|---|
| Peak flux recovery after b/w(l/hr.m²) | 880 | 720 | 660 | 620 | 600 | 580 | 530 | 530 |
| Flux after 't' hours of filtration (l/hr.m²) | 600 | 590 | 540 | 520 | 520 | 480 | 460 | 470 |
| Interval between backwashing 't' (hrs) | 6 | 5 | 6 | 6 | 6 | 6 | 6 | 6 |

| Case (ii) Pressure increase with reverse flow of feed - Mode 2(a) | | | | | | | | |
|---|---|---|---|---|---|---|---|---|
| Peak flux recovery after b/w(l/hr.m²) | 1020 | 1010 | 960 | 840 | 820 | 820 | 820 | 820 |
| Flux after 't' hours of filtration (l/hr.m²) | 500 | 680 | 600 | 600 | 600 | 600 | 600 | 600 |
| Interval between backwashing 't' (hrs) | 16 | 6 | 8 | 6 | 6 | 6 | 6 | 6 |

The flux decline in each case was fairly linear. Thus an average between starting and finishing flux rates (in one time interval) was thought to be a good basis on which to evaluate each of the above cases.

Reverse flow backwashing was clearly the best method of backwashing. After allowing transient flux increases to die away, an average filtrate flux of approximately 700 l/hr.m² was maintained.

After allowing transient flux increases to die away with normal backwashing, an average filtrate flux of approximately 500 l/hr.m² was maintained.

Clearly the reverse flow backwash was about 40% more effective than a normal backwash.

EXAMPLE 10

A suspension of 600 g Ca(OH)$_2$ in 18.3 l water was filtered for 15 minutes at 530° C. before application of each backwash mode as shown in Table VIII. The filtrate fluxes before and after backwash are shown in Table VIII.

The inlet pressure of the cartridge was 200 KPa(g), the outlet pressure was 100 KPa(g) and the cross flow rate was about 2,500 litres/hour.

TABLE VIII

| BACKWASH MODE | TIME hr.min | Peak flux l/hr | BACKWASH MODE | TIME hr.min | Peak flux l/hr |
|---|---|---|---|---|---|
| | 0 | 1600 | | 2.56 | 1400 |
| | .15 | 400 | | 3.11 | 350 |
| 1(b) | | | 4(b) | | |
| | .16 | 1400 | | 3.12 | 1350 |
| | .31 | 410 | | 3.27 | 330 |
| 1(b) | | | 3(b) | | |
| | .32 | 1150 | | 3.28 | 1450 |
| | .47 | 350 | | 3.43 | 350 |
| 1(b) | | | 3(b) | | |
| | .48 | 1100 | | 3.44 | 1420 |
| | 1.03 | 370 | | 3.59 | 360 |
| 1(b) | | | 3(b) | | |
| | 1.04 | 1200 | | 4.00 | 1350 |
| | 1.19 | 370 | | 4.15 | 320 |
| 2(b) | | | 3(b) | | |
| | 1.20 | 1400 | | 4.16 | 1400 |
| | 1.35 | 390 | | 4.31 | 380 |
| 2(b) | | | 5(b) | | |
| | 1.36 | 1550 | | 4.32 | 1400 |
| | 1.51 | 420 | | 4.47 | 380 |
| 2(b) | | | 5(b) | | |
| | 1.52 | 1450 | | 4.48 | 1350 |
| | 2.07 | 320 | | 5.03 | 370 |
| 2(b) | | | 5(b) | | |
| | 2.08 | 1500 | | 5.04 | 1330 |
| | 2.23 | 340 | | 5.19 | 350 |
| 4(b) | | | | | |
| | 2.24 | 1450 | | 5.20 | 1400 |
| | 2.39 | 320 | | 5.35 | 350 |
| 4(b) | | | 5(b) | | |
| | 2.40 | 1400 | | 5.36 | 1400 |
| | 2.55 | 320 | | | |
| 4(b) | | | | | |
| | 5.51 | 320 | | 7.16 | 1350 |
| 3(a) | | | 5(a) | 7.31 | 280 |
| | 5.52 | 1300 | | 7.32 | 1470 |
| | 6.07 | 330 | | 7.47 | 300 |
| 3(a) | | | 5(a) | | |
| | 6.08 | 1400 | | 7.48 | 1450 |
| | 6.23 | 310 | | | |
| 3(a) | | | | | |
| | 6.24 | 1350 | | | |
| | 6.39 | 340 | | | |
| 3(a) | | | | | |
| | 6.40 | 1300 | | | |
| | 6.55 | 310 | | | |
| 4(a) | | | | | |
| | 6.56 | 1300 | | | |
| | 6.11 | 300 | | | |
| 4(a) | | | | | |
| | 6.12 | 1300 | | | |
| | 6.27 | 320 | | | |
| 4(a) | | | | | |
| 6.28 | 1300 | | | | |
| | 6.43 | 350 | | | |
| 4(a) | | | | | |
| | 6.44 | 1350 | | | |
| | 6.59 | 290 | | | |
| 5(a) | | | | | |
| | 7.00 | 1420 | | | |
| | 7.15 | 320 | | | |
| 5(a) | | | | | |

EXAMPLE 11

The same feedstock as Example 10 was filtered at 30° C. and backwashed after 15 minutes in each case. Table IX shows the volume of backwash material collected and the dry weight of the recovered solids.

TABLE IX

| Backwash Mode | b/w material collected (l) | Mass Ca(OH)$_2$ recovered (g) | Recovered material g/l |
|---|---|---|---|
| 1(b) | 6.3 | 281.9 | 44.7 |
| 7(h) (snd) feed off | 2.54 | 232.9 | 91.7 |
| 7(b) (snd) feed off | 1.82 | 202.4 | 111.2 |
| 7(d) (snd) feed off | 2.54 | 168.7 | 66.4 |
| 7(g) (snd) feed off | 1.84 | 173.9 | 94.5 |
| 7(a) (snd) feed off | 1.47 | 148.5 | 101.0 |
| 7(c) (snd) feed off | 1.67 | 126.8 | 75.9 |
| 7(g) (sd) feed off | 0.12 | 42.8 | 356.7 |
| 7(a) (sd) feed off | 0.27 | 51.0 | 188.9 |
| 7(c) (sd) feed off | 0.13 | 28.0 | 215.4 |
| 7(g) (snd) air feed on | 1.98 | 211.3 | 106.7 |
| 7(g) (sd) air feed on | 0.56 | 159.6 | 285.0 |
| 7(e) (snd) air feed on | 1.8 | 183.3 | 101.9 |
| 7(e) (sd) air feed on | 0.24 | 95.4 | 397.7 |
| 7(a) (snd) air feed on | 2.08 | 192.8 | 92.7 |
| 7(a) (sd) air feed on | 0.44 | 118.7 | 269.8 |
| 7(c) (snd) air feed on | 1.86 | 156.8 | 84.3 |
| 7(c) (sd) air feed on | 0.35 | 80.73 | 230.7 |
| 7(i) (snd) air feed on | 1.85 | 156.3 | 84.5 |

TABLE IX-continued

| Backwash Mode | b/w material collected (l) | Mass Ca(OH)₂ recovered (g) | Recovered material g/l |
| --- | --- | --- | --- |
| 7(i) (sd) air feed on | 0.43 | 81.1 | 188.7 |

EXAMPLE 12

In this experiment practical conditions limited the volume of feed, which was therefore recycled through the filter. Clots formed as material was backwashed and blown back into the feed tank where they settled to the bottom and no longer took part in the experiment. This resulted in a steady increase in the minimum flux value after a set interval of time has elapsed after application of the backwash.

A tube in shell cartridge containing microporous polypropylene hollow fibres with approximately 1m² of filtering area was used to filter a suspension containing 50 g Bentonite and 50 g Diatomaceous Earth in 20 litres of water. The suspension was applied to the outer surface of the fibres. The initial filtrate flux was 900 l/hr. After 10 minutes the flux had fallen to 200 l/hr.

Figure 11:
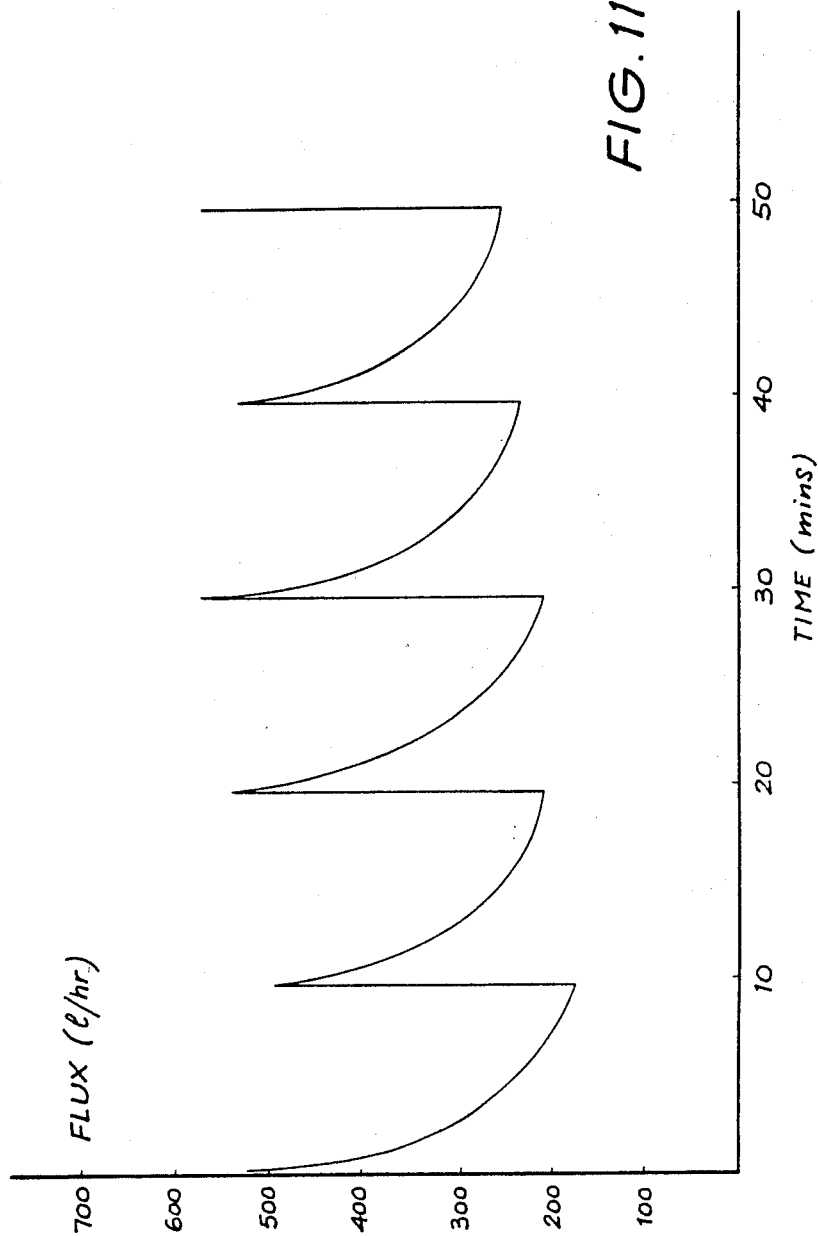

A backwash Mode 1(b) was applied for 30 seconds. The 10 minute cycle was repeated 5 times, and each time the flux dropped to 200 l/hr to 250 l/hr before backwash, and rose to 600 l/hr after backwash. The point to which the flux dropped after each cycle was a little higher each time and clots of solid material could be observed in the material discharged during the backwash cycle. The results are graphed in FIG. 11.

Backwashes of Mode 2(b) were applied at the end of 10 minute cycles on the same system. Each time the procedure was repeated the flux rose to 900 l/hr.

Figure 12:
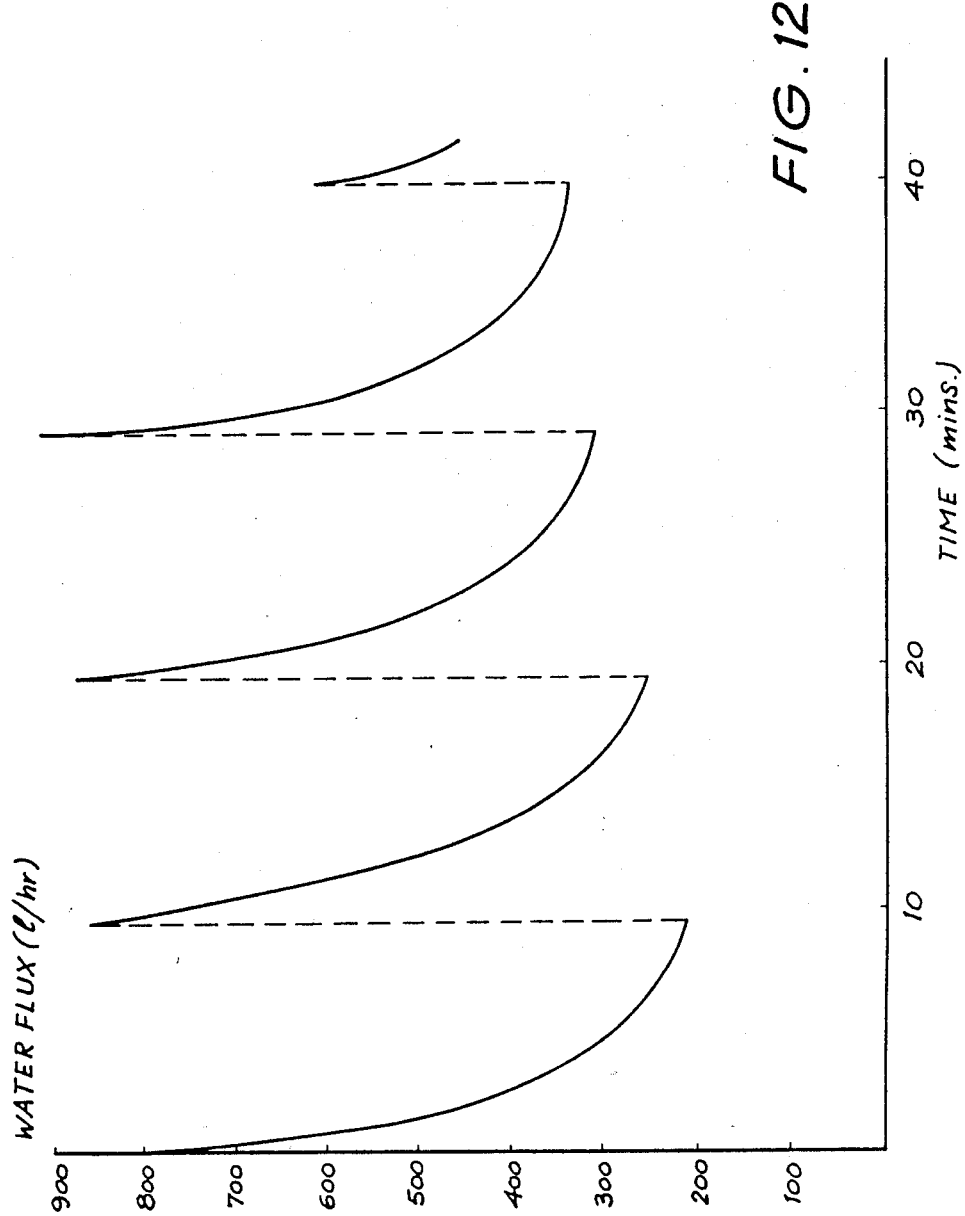

At the conclusion of the Mode 2(b) series of backwash a backwash of Mode 1(b) was again performed. The flux again rose to 600 l/hr after the backwash cycle The results are graphed in FIG. 12.

Figure 13:
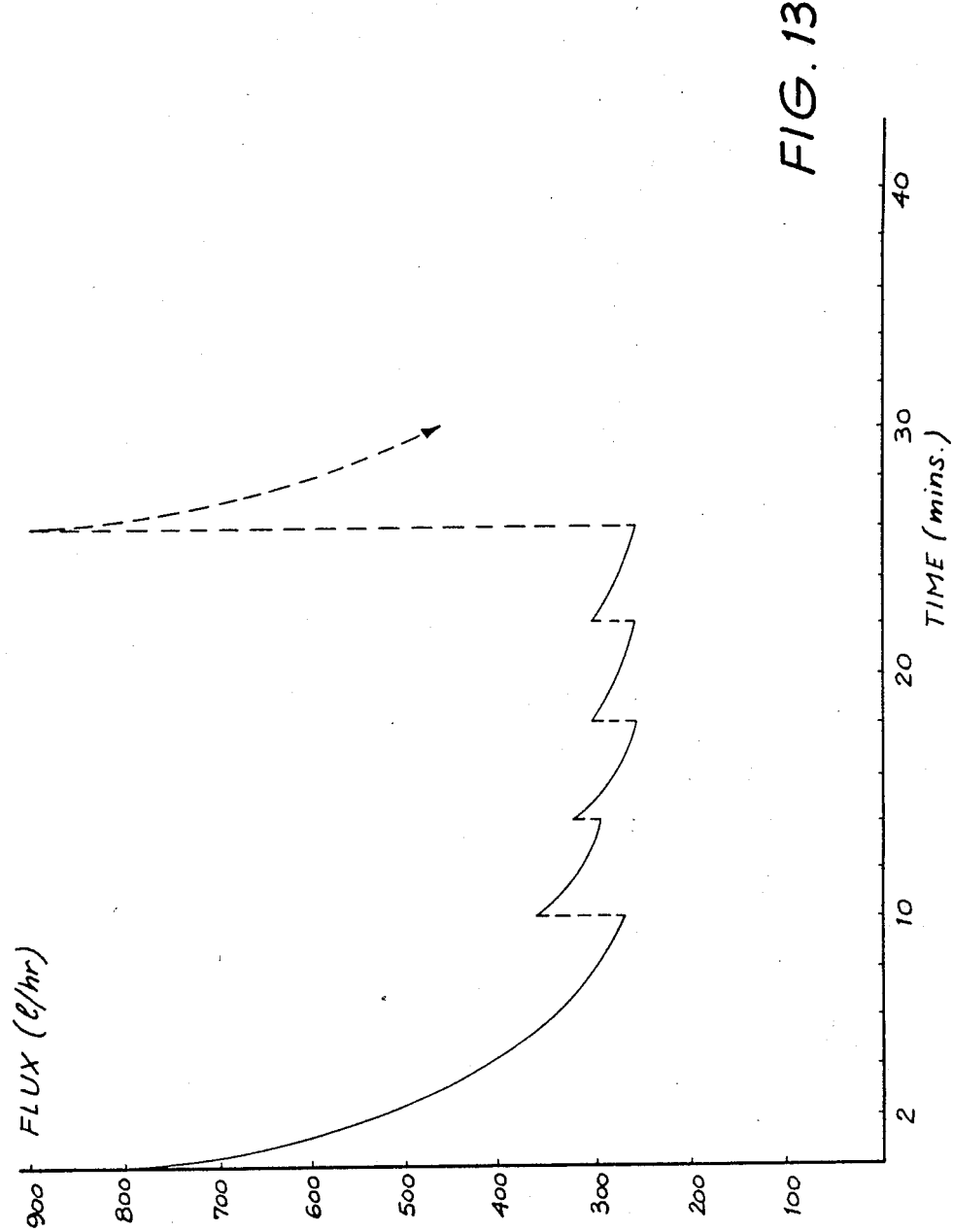

FIG. 13 shows four cycles of reversed feedstock flows without any backwashing followed by a backwash of Mode 2(b). The reversal of direction of flow by itself gives little improvement in flux. The combination of reversing the direction of flow, together with the backwash Mode 1(b) gives a cleaning effect greater than the addition of the two separate techniques.

Various other modifications may be made to the filtration methods and cleaning cycles without departing from the scope and ambit of the invention.

We claim:

1. A method of operating a filter having elastic, microporous, hollow fibers within a shell or housing having a feed inlet thereto and a feed outlet therefrom comprising the steps of:
   (i) introducing a liquid suspension feedstock through the feed inlet to the shell or housing and directing said feedstock to the outer surface of the fibers including:
      (a) passing some of said feedstock through the walls of the fibers so as to be drawn from the fiber lumens as a filtrate or permeate,
      (b) retaining some of the solids in said feedstock on or in the pores of the fibers, and discharging the non-retained solids through a feed outlet from the shell or housing with a remainder of said feedstock,
   (ii) periodically cleaning away the retained solids by:
      (a) introducing a pressurized gas into the fiber lumens which passes through the walls of the fibers to dislodge the retained solids, and,
      (b) varying the pressure within the shell while the gas is being introduced into the lumens.

2. A method of operating a filter having a plurality of elastic, microporous hollow fibers with a shell or housing having a feed inlet thereto and a feed outlet therefrom, comprising the steps of:
   (i) introducing a liquid suspension feedstock into the shell or housing and applying said feedstock to the outer surface of the fibers including:
      (a) passing some of said feedstock through the walls of the fibers so as to be drawn from the fiber lumens as a filtrate or permeate,
      (b) retaining some of the solids in said feedstock on or in the pores of the fibers, and removing the non-retained solids from the shell with a remainder of said feedstock,
   (ii) cleaning away the retained solids by:
      (a) applying to the fiber lumens a gas at a pressure sufficient to stretch substantially all of the pores, followed by,
      (b) maintaining the flow of gas through the lumens for a time period sufficient to drive the liquid from the pores having a bubble point below the pressure of the gas so as to wash out any solids in those pores and to dislodge any solids retained on the outer surface of the fibers such that the washed and dislodged solids are removed from the shell to an external collection point, and,
      (c) varying the pressure within the shell whilst the pressurized gas is being introduced into the lumens.

3. A method according to claim 1 or claim 2 wherein the pressure within the shell is varied during cleaning by increasing the pressure within the shell above the normal gaseous cleaning pressure and then returning the pressure to the normal gaseous cleaning pressure.

4. A method according to claim 3 wherein the feed flow is maintained during the backwash and the pressure increase is achieved by stopping the outflow of feed and the return to the normal gaseous cleaning pressure is achieved by recommencing flow of feed in the reverse direction.

5. A method according to claim 4 wherein the reversal of feed flow is repeated during gaseous cleaning.

6. A method according to claim 3 wherein the feed flow is maintained during the backwash and the pressure increase is achieved by terminating the outflow of feed and the return to normal gaseous cleaning pressure is achieved by resuming outflow of feed.

7. A method according to claim 6 wherein the termination and resumption of feed outflow is repeated during gaseous cleaning.

8. A method according to claim 3 wherein the pressure variation cycle is repeated during gaseous cleaning.

9. A method according to claim 3 wherein the inflow of feed is terminated before commencing the gaseous backwash.

10. A method according to claim 9 wherein the shell outlet is closed and further including the steps of:
   (a) introducing a second gas into the shell side of the fibers at a pressure substantially the same as the pressure of the lumen cleaning gas,
   (b) terminating the flow of the second gas,
   (c) opening one of the feed inlet and the feed outlet to release the gas pressure on the shell side of the fibers and to allow the lumen gas to escape substantially uniformly through the fiber walls.

11. A method according to claim 9 and including the step of introducing a second gas through the shell inlet and wherein the pressure increase is achieved by stopping the outflow of the second gas and the return to the normal gaseous cleaning pressure is achieved by recommencing the flow of the second gas in the reverse direction.

12. A method according to claim 11 wherein termination and reversal of the second gas flow is repeated during gaseous cleaning.

13. A method according to claim 12 wherein the second gas is a high pressure gas.

14. A method according to claim 11 wherein the second gas is a high pressure gas.

15. A method according to claim 14 wherein the second gas is a low pressure gas.

16. A method according to claim 11 wherein the second gas is a low pressure gas.

17. A method according to claim 9 and including the step of introducing a second gas through the shell inlet and wherein the pressure increase is achieved by terminating the outflow of the second gas and the return to normal gaseous cleaning pressure is achieved by resuming the outflow of the second gas.

18. A method according to claim 17 wherein the termination and resumption of second gas outflow is repeated during gaseous cleaning.

19. A method according to claim 18 wherein the second gas is a high pressure gas.

20. A method according to claim 18 wherein the second gas is a low pressure gas.

21. A method according to claim 17 wherein the second gas is a high pressure gas.

22. A method according to claim 17 wherein the second gas is a low pressure gas.

23. A method according to claim 22 and including the step of introducing a second gas through the shell inlet and wherein the pressure reduction is achieved by terminating the inflow of the second gas and the return to normal gaseous cleaning pressure is achieved by recommencing the flow of the second gas in the reverse direction.

24. A method according to claim 23, wherein the termination and reversal of the second gas flow is repeated during gaseous cleaning.

25. A method according to claim 24 wherein the second gas is a high pressure gas.

26. A method according to claim 24 wherein the second gas is a low pressure gas.

27. A method according to claim 23 wherein the second gas is a high pressure gas.

28. A method according to claim 23 wherein the second gas is a low pressure gas.

29. A method according to claim 1 or claim 2 wherein the pressure within the shell is varied during cleaning by decreasing the pressure within the shell below the normal gaseous cleaning pressure and then returning the pressure to the normal gaseous cleaning pressure.

30. A method according to claim 29 wherein the feed flow is maintained during the backwash and the pressure reduction is achieved by terminating the inflow of feed and the return to normal gaseous cleaning pressure is achieved by resuming inflow of feed.

31. A method according to claim 30, wherein the termination and resumption of feed inflow is repeated during gaseous cleaning.

32. A method according to claim 24 wherein the pressure variation cycle is repeated during gaseous cleaning.

33. A method according to claim 29 wherein the feed flow is maintained during the backwash and the pressure reduction is achieved by terminating the inflow of feed and the return to normal gaseous cleaning pressure is achieved by recommencing flow of feed in the reverse direction.

34. A method according to claim 33 wherein the termination and resumption of feed is repeated during gaseous cleaning.

35. A method according to claim 29 wherein the inflow of feed is terminated before commencing the gaseous backwash.

36. A method according to claim 35 and including the step of introducing a second gas through the shell inlet and wherein the pressure reduction is achieved by terminating the inflow of the second gas and the return to normal gaseous cleaning pressure is achieved by recommencing flow of the second gas.

37. A method according to claim 36 wherein the second gas is a high pressure gas.

38. A method according to claim 36 wherein the termination and resumption of outflow is repeated during gaseous cleaning.

39. A method according to claim 38 wherein the second gas is a low pressure gas.

40. A method according to claim 38 wherein the second gas is a high pressure gas.

41. A method according to claim 38 wherein the second gas is a low pressure gas.

42. A method according to claim 35 wherein the shell outlet is closed and further including the steps of:
 (a) introducing a second gas into the shell side of the fibers at a pressure substantially the same as the pressure of the lumen cleaning gas,
 (b) terminating the flow of the second gas,
 (c) opening one of the feed inlet and the feed outlet to release the gas on the shell side of the fibers and to allow the lumen gas to escape substantially uniformly through the fiber walls.

43. A method according to claim 1 and including the step of pressurizing the fibers after the completion of the backwash and the releasing the pressure to remove trapped air from the pores of the fibers.

44. A method according to claim 43 wherein the step of pressurizing the fibers is carried out while lumen flow is blocked.

45. A method according to claim 44 wherein the lumen flow is blocked in a pulsing fashion.

46. A method according to claim 45 wherein the step of pressurizing the fibers is carried by applying a hydraulic pressure to the feed side of the fibers.

47. A method according to claim 45 wherein the step of pressurizing the fibers is carried out by applying a hydraulic pressure to the feed side of the fibers.

48. A method according to claim 43 wherein the step of pressurizing the fibers is carried out by applying a hydraulic pressure to the feed side of the fibers.

49. A method according to claim 43 wherein the step of pressurizing the fibers is carried out by applying a hydraulic pressure to the feed side of the fibers.

50. A method according to claim 1 wherein the fiber lumens are drained before commencement of the gaseous backwash.

51. A method according to claim 1 wherein the shell is drained before commencement of backwash.

52. A method according to claim 1 wherein the introduction of the pressurized gas includes the steps of:
(a) initially applying the gas at a pressure below the bubble point of the walls of the fibers so as to displace any liquid from the fiber lumens,
(b) closing the feed inlet to and the feed outlet from the shell,
(c) increasing the pressure of the gas above the bubble point of the walls of the fibers, and,
(d) opening the feed inlet and outlet to allow the gas to escape substantially the uniformly through the fiber walls.

53. A method according to claim 1 wherein the filter is a cross-flow filter.

54. A method according to claim 1 wherein the filter is operated in a dead-end filtering mode with no outflow of feed and solids from the shell during the dead-end filtration.

55. A method according to claim 1 wherein during the pressure variation step, feed is introduced into the shell between the shell inlet and outlet and is discharged through both the shell inlet and shell outlet to an external collection point.

56. A filter system comprising:
(a) a shell or housing,
(b) a plurality of elastic, microporous hollow fibers within the shell,
(c) a feed inlet to the shell,
(d) a feed outlet from the shell,
(e) a filtrate outlet from the shell,
(f) valve means for introducing a liquid suspension feedstock through the feed inlet to the shell and for directing said feedstock to the outer surface of the fibers such that:
  (i) some of said feedstock passes through the walls of the fibers to be drawn from the fiber lumens as a filtrate or permeate and to be discharged through the filtrate outlet,
  (ii) some of the solids in said feedstock are retained on or in the pores of the fibers, with the non-retained solids being discharged through the feed outlet from the shell or housing with the remainder of said feedstock,
(g) valve means for controlling the outflow through the shell outlet,
(h) valve means for introducing a pressurized gas into the fiber lumens which passes through the walls of the fibers to dislodge the retained solids, and,
(i) control means for varying the pressure within the shell while the gas is being introduced into the lumens.

57. A filter system comprising:
(a) a shell or housing,
(b) a plurality of elastic, microporous hollow fibers within the shell,
(c) a feed inlet to the shell,
(d) a feed outlet from the shell,
(e) a filtrate outlet from the shell,
(f) valve means for introducing a liquid suspension feedstock through the feed inlet to the shell and for applying said feedstock to the outer surface of the fibers such that:
  (i) some of said feedstock passes through the walls of the fibers to be drawn from the fiber lumens as a filtrate or permeate and to be discharged through the filtrate outlet,
  (ii) some of the solids in said feedstock are retained on or in the pores of the fibers, with the non-retained solids being removed from the shell with the remainder of said feedstock,
(g) valve means for controlling the outflow through the shell outlet,
(h) valve means for introducing a pressurized gas through the fiber lumens which passes through the walls of the fibers to wash out at least some of the retained solids and then,
(i) valve means for introducing through the fiber lumens a pressurized gas which passes through the walls of the fibers and stretches elastically at least some of the pores to dislodge any solids retained in those pores and which washes the external walls of the fibers, the gas being applied at a pressure which is sufficient to overcome the resistance to gas flow of the surface tension of the continuous phase of the control filtrate within the pores of the membrane, and,
(j) means for varying the pressure within the shell whilst the pressurized gas is being introduced into the lumens.

58. A filter system according to claim 56 or claim 57 wherein the control means is adapted to actuate the valve means to increase the pressure within the shell above the normal gaseous cleaning pressure and to return the pressure to the normal gaseous cleaning pressure.

59. A filter system according to claim 58 wherein the control means is adapted to actuate the shell outlet valve means to close the shell outlet and then to open the shell outlet.

60. A filter system according to claim 59 wherein the control means is adapted to actuate the shell outlet valve means to close the shell outlet and wherein the system further includes valve means for reversing the flow of feed through the shell and the control means is adapted to actuate the reversing valve means to re-establish reverse flow of feed through the shell.

61. A filter system according to claim 59 wherein the control means is adapted to actuate the shell inlet valve means to close the shell inlet and wherein the system further includes valve means for reversing the flow of feed through the shell and the control means is adapted to actuate the reversing valve means to reestablish reverse flow of feed through the shell.

62. A filter system according to claim 56 or claim 57 wherein the control means is adapted to actuate the valve means to decrease the pressure within the shell below the normal gaseous cleaning pressure and to return the pressure to the normal gaseous cleaning pressure.

63. A filter system according to claim 62 wherein the control means is adapted to actuate the shell inlet valve means to close the shell inlet valve and to open the shell inlet.

64. A filter system as claimed in either claim 56 or claim 57 and including valve means for introducing a second gas through the shell inlet.

65. A filter system according to claim 64 wherein the control means is adapted to close the shell outlet to effect a pressure increase in the shell and to open the shell outlet to re-establish outflow through the shell outlet.

66. A filter system, according to claim 65 and further including valve means for reversing the flow of the second gas through the shell and wherein the control means is adapted to operate the reversing valve means.

67. A filter system according to claim 66 and further including valve means for reversing the flow of the second gas through the shell and wherein the control means is adapted to operate the reversing valve means.

68. A filter system according to 66 and including means for closing off the filtrate flow.

69. A filter system according to claim 64 wherein the control means is adapted to close the shell inlet to effect a pressure decrease in the shell and to open the shell inlet to re-establish inflow of the second gas.

70. A filter system according to claim 64 and including means for closing off the filtrate flow.

* * * * *